United States Patent
Choi et al.

(10) Patent No.: US 9,807,488 B2
(45) Date of Patent: Oct. 31, 2017

(54) ELECTRONIC DEVICE HAVING EAR JACK ASSEMBLY AND METHOD OF OPERATION THE SAME

(71) Applicant: Samsung Electronics Co., Ltd., Suwon-si, Gyeonggi-do (KR)

(72) Inventors: Bo-Kun Choi, Seoul (KR); Doo-Suk Kang, Suwon-si (KR); Seung-Nyun Kim, Incheon (KR); Dong-Hyun Yeom, Bucheon-si (KR); Han-Jib Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 208 days.

(21) Appl. No.: 14/594,524

(22) Filed: Jan. 12, 2015

(65) Prior Publication Data

US 2015/0201263 A1 Jul. 16, 2015

(30) Foreign Application Priority Data

Jan. 13, 2014 (KR) ........................ 10-2014-0003770

(51) Int. Cl.
| | |
|---|---|
| H04R 1/06 | (2006.01) |
| G06F 3/0487 | (2013.01) |
| G06F 1/16 | (2006.01) |
| G06F 3/02 | (2006.01) |
| G06F 3/0362 | (2013.01) |
| H04R 1/10 | (2006.01) |

(52) U.S. Cl.
CPC ............ *H04R 1/06* (2013.01); *G06F 1/1684* (2013.01); *G06F 3/02* (2013.01); *G06F 3/0202* (2013.01); *G06F 3/0362* (2013.01); *G06F 3/0487* (2013.01); *H04R 1/10* (2013.01)

(58) Field of Classification Search
CPC .... H04R 1/06; H04R 1/01; G06F 3/02; G06F 3/0202; G06F 3/0362; G06F 3/0487; G06F 1/1684
USPC .......................................................... 381/74
See application file for complete search history.

(56) References Cited

U.S. PATENT DOCUMENTS

| | | | |
|---|---|---|---|
| 4,593,162 | A | 6/1986 | Rochette |
| 2004/0212586 | A1 | 10/2004 | Denny, III |
| 2008/0247592 | A1 | 10/2008 | Kourzanov |
| 2009/0108837 | A1 | 4/2009 | Johansson et al. |
| 2009/0179789 | A1 | 7/2009 | Haughay, Jr. et al. |
| 2010/0130132 | A1 | 5/2010 | Lee et al. |
| 2011/0300751 | A1 | 12/2011 | Wittenberg et al. |
| 2011/0317855 | A1 | 12/2011 | Andersson et al. |
| 2012/0183152 | A1 | 7/2012 | Hankey et al. |
| 2012/0230508 | A1 | 9/2012 | Chuang et al. |

(Continued)

FOREIGN PATENT DOCUMENTS

| | | |
|---|---|---|
| EP | 2 224 226 A1 | 9/2010 |
| EP | 2 442 537 A1 | 4/2012 |

(Continued)

*Primary Examiner* — David Ton
(74) *Attorney, Agent, or Firm* — Jefferson IP Law, LLP

(57) ABSTRACT

An electronic device is provided. The electronic device includes a rotation body rotatably installed in the electronic device, a rotation guide body installed to rotate the rotation body, at least one body to be detected disposed at a specific gap in the rotation body, at least one detection sensor for detecting the at least one body to be detected according to a rotation of the rotation body, and a processor that controls to perform a preset function according to detection of the detection sensor.

23 Claims, 29 Drawing Sheets

(56) References Cited

U.S. PATENT DOCUMENTS

| | | |
|---|---|---|
| 2012/0231778 A1 | 9/2012 | Chen et al. |
| 2012/0281850 A1 | 11/2012 | Hyatt |
| 2013/0004011 A1 | 1/2013 | Hayashida et al. |
| 2013/0148819 A1 | 6/2013 | You et al. |

FOREIGN PATENT DOCUMENTS

| | | |
|---|---|---|
| JP | 8-84391 A | 3/1996 |
| JP | 2004-014391 A | 1/2004 |
| KR | 10-2010-0059345 A | 6/2010 |
| KR | 10-2010-0116318 A | 11/2010 |

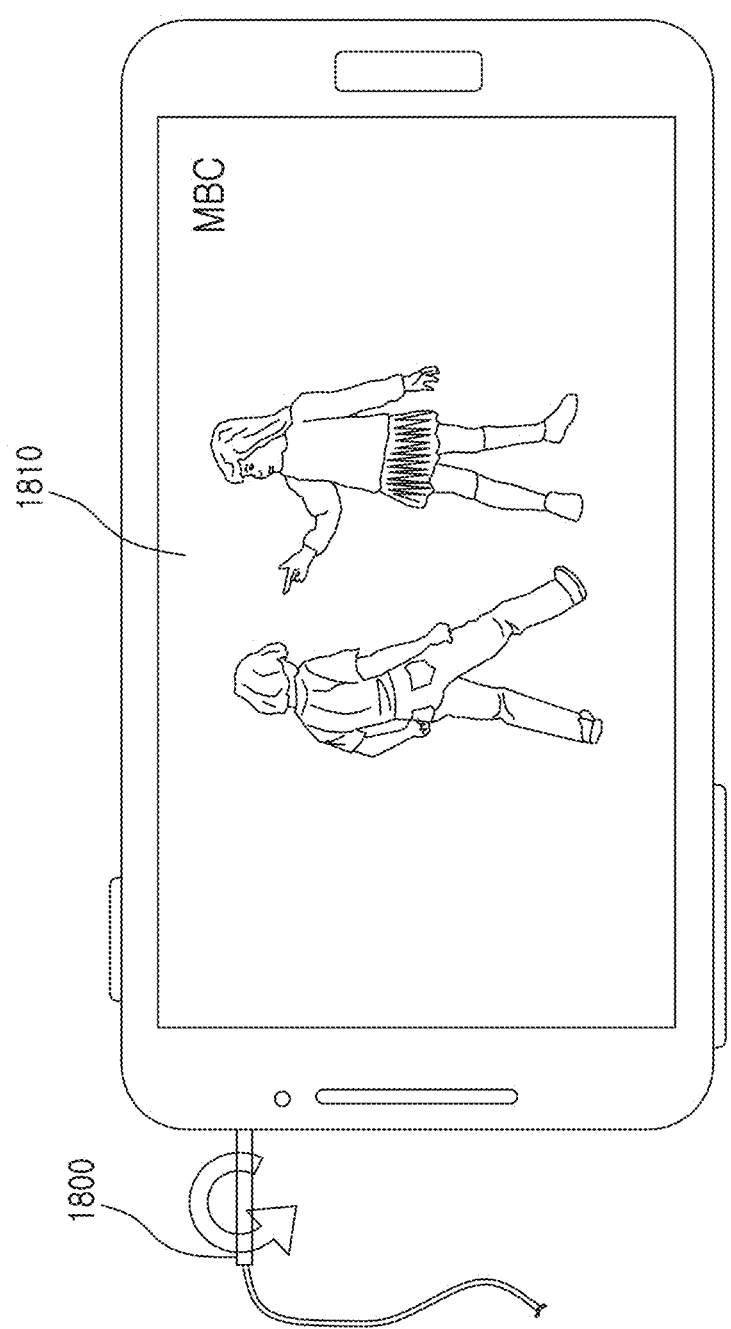

ELECTRONIC DEVICE HAVING EAR JACK ASSEMBLY AND METHOD OF OPERATION THE SAME

CROSS-REFERENCE TO RELATED APPLICATION(S)

This application claims the benefit under 35 U.S.C. §119(a) of a Korean patent application filed on Jan. 13, 2014 in the Korean Intellectual Property Office and assigned Serial number 10-2014-0003770, the entire disclosure of which is hereby incorporated by reference.

TECHNICAL FIELD

The present disclosure relates to an electronic device having an ear jack assembly and a method of operation for the same.

BACKGROUND

With the development of information and communication technology and semiconductor technology, various electronic devices have been developed into a multimedia device that provides various multimedia services. For example, an electronic device may provide various multimedia services such as a messenger service, a broadcasting service, a wireless Internet service, a camera service, or a music reproduction service.

The electronic devices have various functions, but a device advantageous in relation to portability may be highly competitive relative to other devices. A user prefers an electronic device having a small thickness, an enhanced external appearance, and excellent portability. Therefore, electronic devices minimize hardware keys to be exposed to the outside so as to have a small thickness, a small size, and excellent portability.

As electronic devices have a small thickness and a small size, hardware keys exposed to the outside gradually reduce. Reduction of such a hardware key may limit use of a hardware-based key of the user and deteriorate a manipulation ability of the electronic device. Accordingly, the electronic device requests a remarkable physical key that can satisfy a user desire.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device having an ear jack assembly for securing an additional physical key without change of a design and a method of operating the same.

Another aspect of the present disclosure is to provide an electronic device having an ear jack assembly for providing a user interface using an ear jack plug and a method of operating the same.

Another aspect of the present disclosure is to provide an electronic device having an ear jack assembly for securing competitive power of a product interlocking with a peripheral device and a method of operating the same.

In accordance with an aspect of the present disclosure, an electronic device is provided. The electronic device includes a rotation body rotatably installed in the electronic device, a rotation guide body installed to rotate the rotation body, at least one body to be detected disposed at a specific gap in the rotation body, at least one detection sensor for detecting the at least one body to be detected according to a rotation of the rotation body, and a processor that controls to perform a preset function according to detection of the detection sensor.

In accordance with another aspect of the present disclosure, a method of operating an electronic device is provided. The method includes detecting a rotation of a rotation body installed in the electronic device, acquiring at least one parameter related to a rotation of the detected rotation body, and performing a corresponding function based on the acquired parameter.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 18A and 18B are diagrams illustrating a screen configuration for controlling a function of an electronic device using an ear jack plug according to various embodiments of the present disclosure.

The same reference numerals are used to represent the same elements throughout the drawings.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An electronic device according to an embodiment of the present disclosure may include at least one of a smart phone, a tablet Personal Computer (PC), a mobile phone, a video phone, an e-book reader, a desktop PC, a laptop PC, a Netbook computer, a Personal Digital Assistant (PDA), a Portable Multimedia Player (PMP), an MPEG3 (MP3) player, accessory, electronic appcessory, a camera, a wearable device, a wrist watch, a refrigerator, an air-conditioner, a cleaner, an artificial intelligent robot, a television, a Digital Versatile Disk (DVD) player, an audio device, an oven, a microwave oven, a washing machine, an electronic bracelet, an electronic necklace, an air cleaner, an electronic frame, a medical device, a navigation device, a satellite signal receiver, an Event Data Recorder (EDR), a Flight Data Recorder (FDR), a set-top box, a television box, an electronic dictionary, a vehicle infotainment device, an electronic equipment for ship, avionics, a security device, electronic clothing, an electronic key, a camcorder, a game console, a Head-Mounted Display (HMD), a flat panel display device, an electronic album, a portion of furniture or a building/structure including an electronic device, an electronic board, an electronic signature receiving device, and a projector. Further, an electronic device according to the present disclosure is not limited to the foregoing devices.

Figure 1:
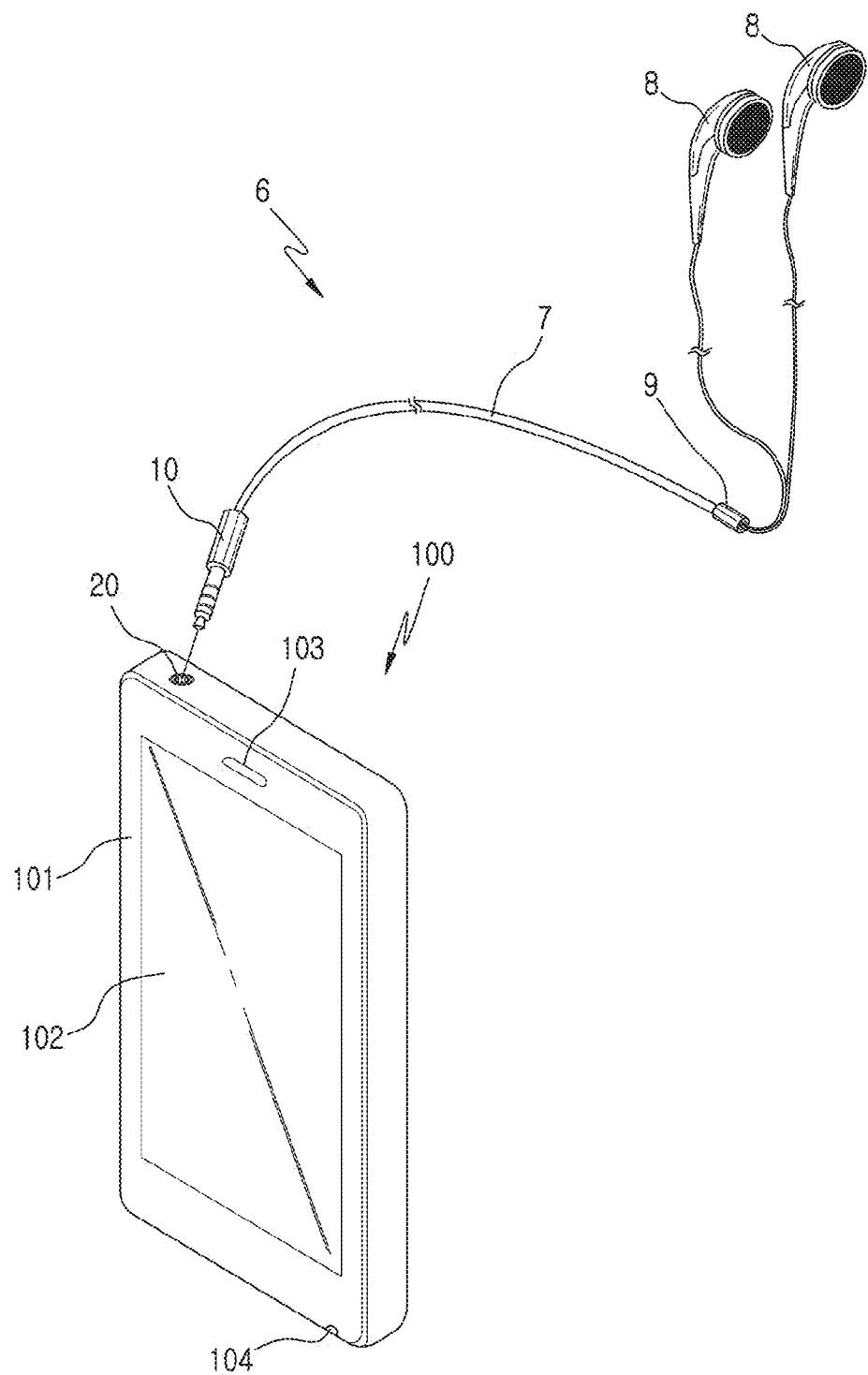
FIG. 1 is a diagram illustrating an electronic device and an earphone having an ear jack assembly according to an embodiment of the present disclosure.

FIG. 1 is a diagram illustrating an electronic device and an earphone having an ear jack assembly according to an embodiment of the present disclosure.

Referring to FIG. 1, at a front surface 101 of an electronic device 100, a display unit 102 may be disposed. The display unit 102 may display an electrical signal received from the electronic device 100 into a text and an image such as graphic and video. Such a display unit 102 may be implemented with a touch screen that can simultaneously input and output data by applying a touch sensor.

In an upper portion of the display unit 102 or the front surface 101, a speaker device 103 for outputting a sound may be installed, and in a lower portion of the display unit 102 or the front surface 101, a microphone device 104 for receiving a sound input may be installed. Further, at an appropriate location of the electronic device 100, an ear jack assembly 20 for inserting an ear jack plug 10 of an earphone 6 may be installed.

In a cable 7 having a predetermined length of the earphone 6, a pair of ear speakers 8 may be installed, and at an intermediate portion thereof, a microphone device 9 including a manipulation button (SEND/END key) may be further installed.

According to an embodiment of the present disclosure, when the ear jack plug 10 of the earphone 6 is inserted into the electronic device 100 (e.g., the ear jack assembly 20), the electronic device 100 may automatically detect that the earphone 6 is connected and perform a function corresponding thereto. For example, when the electronic device 100 detects a connection of the earphone 6, the electronic device 100 may convert an audio path of the electronic device 100 to the ear speaker 8 of the earphone 6.

According to an embodiment of the present disclosure, in a state in which the ear jack plug 10 of the earphone 6 is inserted, the electronic device 100 may detect that the ear jack plug 10 is rotated and perform a function corresponding thereto. For example, the electronic device 100 may detect a rotation of the ear jack plug 10 and adjust a sound volume, convert an operation mode, or execute a specific application. However, a function of the electronic device 100 is not limited thereto and the electronic device 100 may have various functions that can detect a rotation of the ear jack plug 10 and perform operation.

Figure 2:
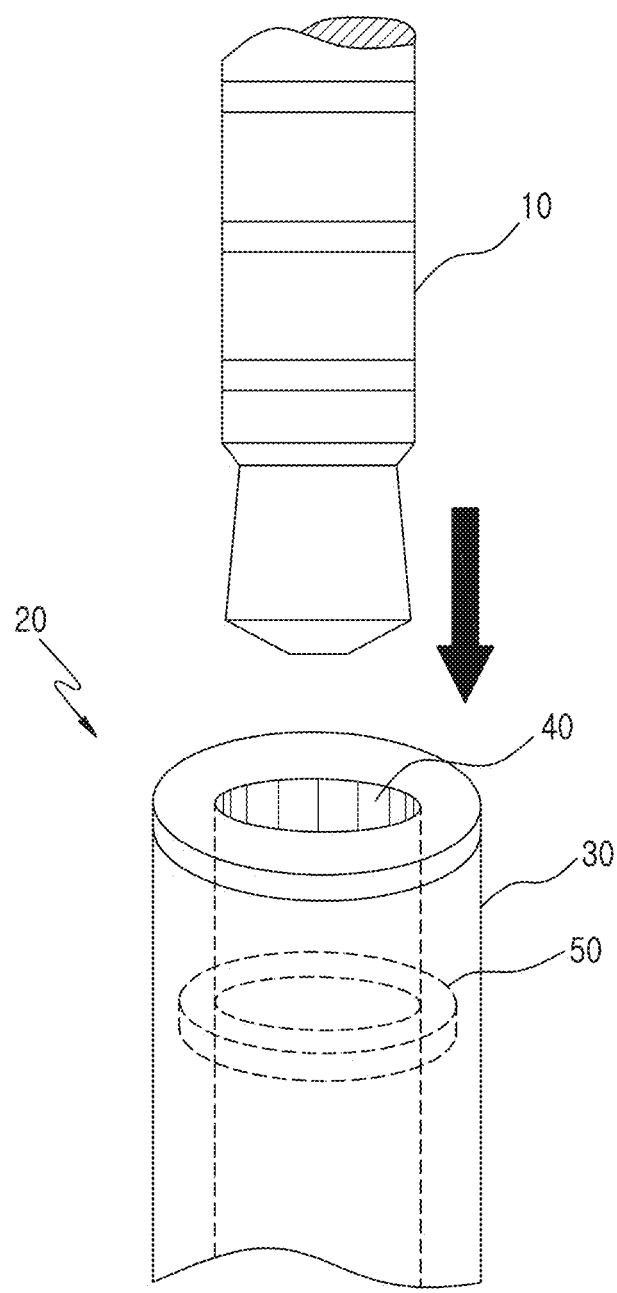
FIG. 2 is a diagram illustrating a rotation ring of an ear jack assembly before an ear jack plug is inserted according to an embodiment of the present disclosure.
Figure 3:
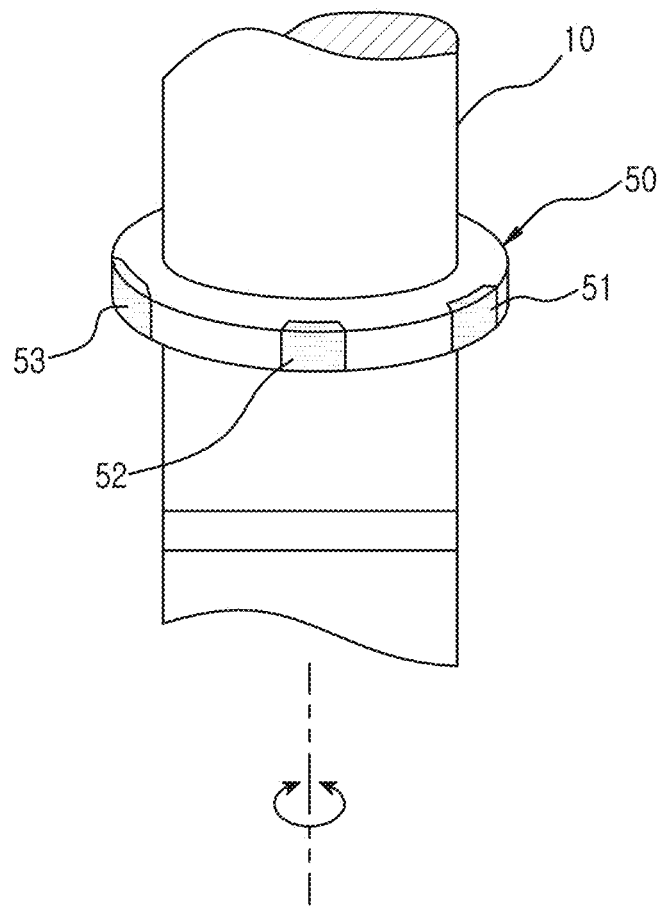
FIG. 3 is a diagram illustrating a rotation ring when an ear jack plug is inserted according to an embodiment of the present disclosure.

FIG. 2 is a diagram illustrating a rotation ring of an ear jack assembly before an ear jack plug is inserted according to an embodiment of the present disclosure. FIG. 3 is a diagram illustrating a rotation ring when an ear jack plug is inserted according to an embodiment of the present disclosure.

Referring to FIGS. 2 and 3, the ear jack assembly 20 may include a hollow housing 30 having a predetermined length and a rotation ring 50 installed to rotate at an internal space 40 of the housing 30. The rotation ring 50 may be installed to close contact with the housing 30 by a predetermined support member. According to various embodiments of the present disclosure, the rotation ring 50 is a hollow rotation ring, but the rotation ring 50 is not limited thereto and may be various rotation bodies that can rotate.

According to an embodiment of the present disclosure, when the ear jack plug 10 is housed into the internal space 40 of the housing 30, the ear jack plug 10 may be mounted with a method of penetrating the rotation ring 50 installed at the internal space 40. In such a case, the rotation ring 50 may be coupled at a corresponding location of the ear jack plug 10 to rotate together with the ear jack plug 10.

According to an embodiment of the present disclosure, the rotation ring 50 may include a plurality of bodies 51, 52, and 53 to be detected installed to be separated. When the rotation ring 50 rotates, such bodies 51, 52, and 53 to be detected may be detected by a predetermined detection sensor and thus the electronic device may determine whether the rotation ring 50 has been rotated through the detection sensor and determine a rotation distance, a rotation direction, and a rotation speed of the rotation ring 50.

According to an embodiment of the present disclosure, the electronic device may provide short vibration feedback to a user whenever the electronic device detects a plurality of bodies 51, 52, and 53 to be detected or according to a rotation of the rotation ring 50. Further, the user may determine a rotation amount of the rotation ring 50 through a physical reaction when the rotation ring 50 rotates.

Figure 4:
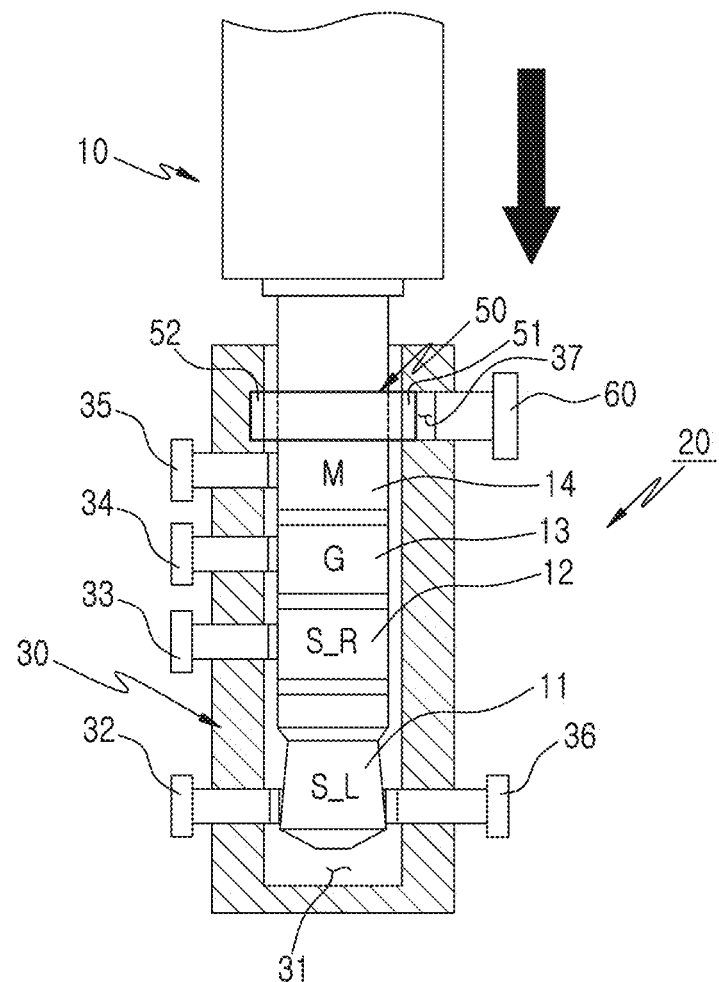
FIG. 4 is a partially cross-sectional view illustrating a state in which an ear jack plug is inserted into an ear jack assembly according to an embodiment of the present disclosure.

FIG. 4 is a partially cross-sectional view illustrating a state in which an ear jack plug is inserted into an ear jack assembly according to an embodiment of the present disclosure.

Referring to FIG. 4, a 4-pole ear jack plug is illustrated. As illustrated in FIG. 4, a lowermost first terminal 11 of the ear jack plug 10 may take charge SPK_L, a second terminal 12 of an upper portion thereof may take SPK_R, a third terminal 13 of an upper portion thereof may take GND, and a fourth terminal 14 of an upper portion thereof may take MIC. Further, the first terminal 11, the second terminal 12, the third terminal 13, and the fourth terminal 14 may be disposed to correspond to a SPK_L pin 32, a SPK_R pin 33, a GND pin 34, and a MIC pin 35 sequentially protruding to a space 31 of the housing 30 constituting the ear jack assembly 20. Therefore, when the ear jack plug 10 is completely inserted into the space 31 of the ear jack housing 30, the SPK_L terminal 11, the SPK_R terminal 12, the GND terminal 13, and the MIC terminal 14 of the ear jack plug 10 are connected to correspond to the SPK_L pin 32, the SPK_R pin 33, the GND pin 34, and the MIC pin 35 of the ear jack assembly 20, and in this case, a detect pin 36 installed in the ear jack housing 30 contacts with the SPK_L terminal 11 to detect whether the earphone 6 is inserted.

According to an embodiment of the present disclosure, when the ear jack plug 10 is inserted into the space 31 of the ear jack housing 30, the rotation ring 50 installed in the housing 30 may be disposed at an upper portion of the MIC terminal 14 of the ear jack plug 10. The rotation ring 50 may have predetermined elasticity and be inserted at a corresponding location of the ear jack plug 10.

According to an embodiment of the present disclosure, the rotation ring 50 may be formed to rotate together with the ear jack plug 10, and at least one bodies 51 and 52 to be detected installed to be separated from the rotation ring 50 may also together rotate. When the rotation ring 50 rotates, such bodies 51 and 52 to be detected may be detected by at least one detection sensor 60 installed at a location corresponding to the rotation ring 50.

According to an embodiment of the present disclosure, the detection sensor 60 may detect the bodies 51 and 52 to be detected of the rotation ring 50 exposed through an opening 37 formed in the ear jack housing 30. At least one detection sensor 60 may be installed and may be electrically connected to a substrate of the electronic device.

Figure 5:
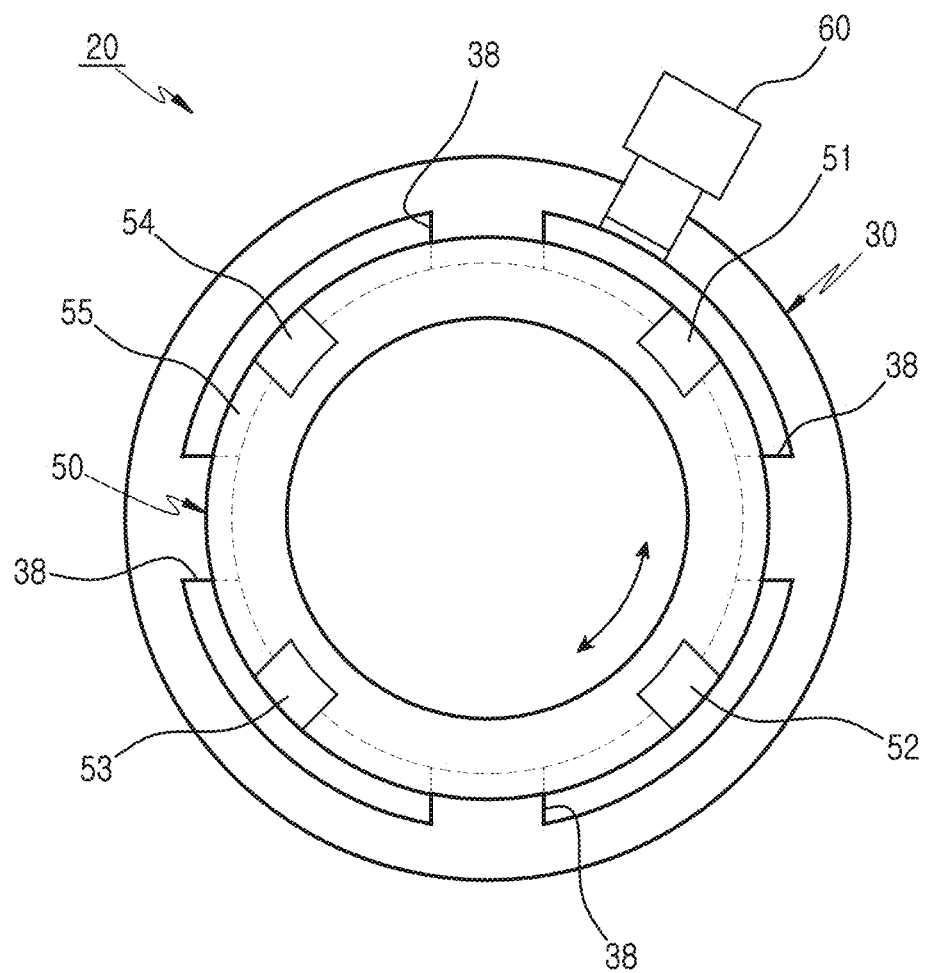
FIG. 5 is a top plan view illustrating a configuration of an ear jack assembly according to an embodiment of the present disclosure.

FIG. 5 is a top plan view illustrating a configuration of an ear jack assembly according to an embodiment of the present disclosure.

Referring to FIG. 5, the ear jack housing 30 may include a support jaw 38 protruded in a predetermined length at an inner side surface. In order to support the rotation ring 50, the support jaw 38 may be formed at a predetermined gap along an inner circumferential edge of the housing 30. Such a support jaw 38 may be inserted into a guide groove 55 of a predetermined length formed along an outer circumferential edge of the rotation ring 50.

According to an embodiment of the present disclosure, the support jaw 38 may be integrally formed with the ear jack housing 30. Further, the support jaw 38 is a separate member and may be fixed to an inner side surface of the ear jack housing 30 with a bonding method.

According to an embodiment of the present disclosure, the support jaw 38 may be made of a rigid material, and the rotation ring 50 may be made of a flexible material such as rubber, urethane, silicon, or the like. In contrast, the rotation ring 50 may be made of a rigid material, and the support jaw 38 may be made of a flexible material such as rubber, urethane, silicon, or the like. Therefore, the rotation ring 50 receives and rotates an external force of a predetermined frictional force or more at a guide groove 55 contacting with the support jaw 38.

According to an embodiment of the present disclosure, the rotation ring 50 may include a plurality of bodies 51, 52, 53, and 54 to be detected separately installed at a predetermined gap. When the rotation ring 50 rotates, such bodies 51, 52, 53, and 54 to be detected may be detected by at least one detection sensor 60 installed at a location corresponding to the rotation ring 50.

According to an embodiment of the present disclosure, when the rotation ring 50 rotates, the detection sensor 60 may detect the bodies 51, 52, 53, and 54 to be detected of the rotation ring 50 exposed through an opening formed in the ear jack housing 30. Further, the detection sensor 60 is protruded to the inside of the housing 30 to detect that the rotation ring 50 has been rotated with a method of contacting with the bodies 51, 52, 53, and 54 to be detected of the rotation ring 50.

According to an embodiment of the present disclosure, the detection sensor 60 may be a resistance sensor, and in such a case, the bodies 51, 52, 53, and 54 to be detected of the rotation ring 50 may have different resistance values. For example, when the rotation ring 50 rotates, the resistance sensor may measure a resistance value of the respective bodies 51, 52, 53, and 54 to be detected contacting with the resistance sensor. Therefore, by comparing the measured resistance values, the resistance sensor may determine a rotation distance, a rotation speed, and a rotation direction of the rotation ring 50.

According to an embodiment of the present disclosure, the detection sensor 60 may be a capacitance measurement sensor including a sensor capacitance, and in such a case, the bodies 51, 52, 53, and 54 to be detected of the rotation ring 50 may have a capacitance value having different capacitances. For example, when the rotation ring 50 rotates, the capacitance measurement sensor may measure a capacitance value of the respective bodies 51, 52, 53, and 54 to be detected contacting with the capacitance measurement sensor. Therefore, the capacitance measurement sensor may compare the measured capacitance values and determine a rotation distance, a rotation speed, and a rotation direction of the rotation ring 50.

According to an embodiment of the present disclosure, the detection sensor 60 may be a hall sensor, and in such a case, the bodies 51, 52, 53, and 54 to be detected of the rotation ring 50 may be a magnet having different magnetic forces. For example, when the rotation ring 50 rotates, the hall sensor may detect a magnetic force of respective magnets that close contact with the hall sensor. Therefore, the hall sensor may determine a rotation distance, a rotation speed, and a rotation direction of the rotation ring 50 through the detected magnetic force.

However, the detection sensor 60 is not limited thereto and may be implemented with various sensors such as a light sensor or a proximity sensor. Further, the detection sensor 60 may determine rotation information such as a rotation distance, a rotation speed, and a rotation direction of the rotation ring 50 using at least one other bodies 51, 52, 53, and 54 to be detected.

Figure 6:
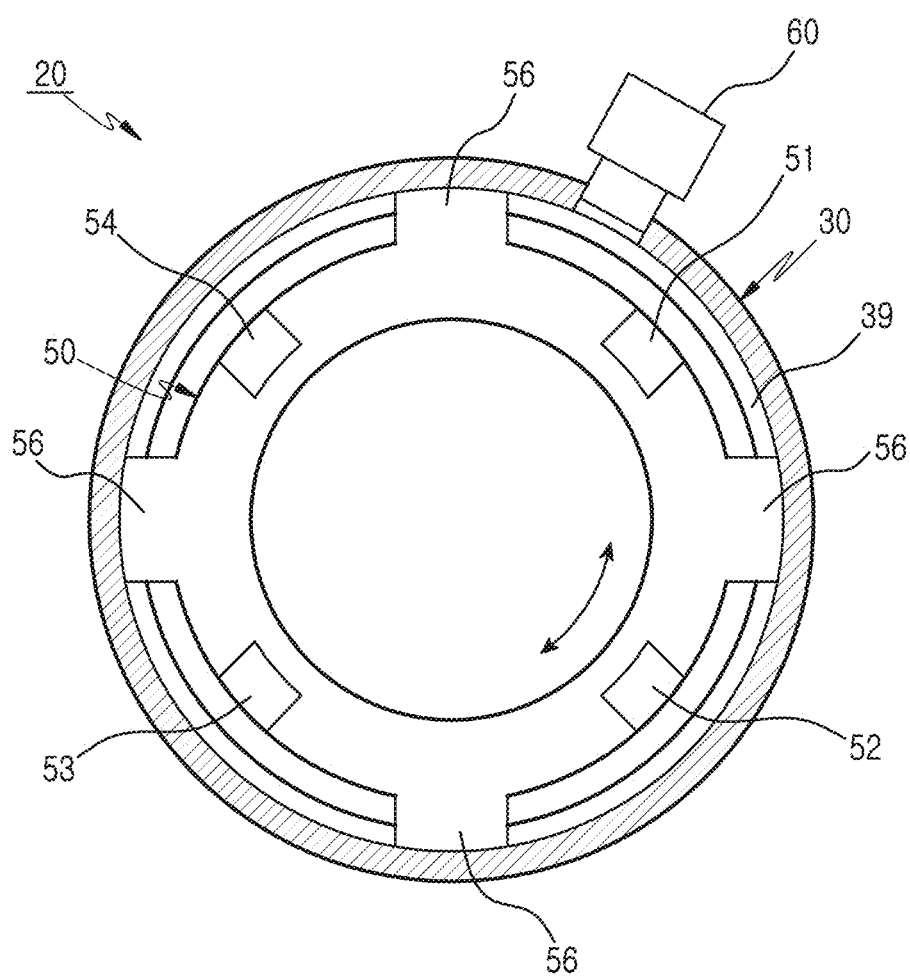
FIG. 6 is a top plan view illustrating a configuration of an ear jack assembly according to an embodiment of the present disclosure.

FIG. 6 is a top plan view illustrating a configuration of an ear jack assembly according to an embodiment of the present disclosure.

Referring to FIG. 6, the ear jack housing 30 may include a guide jaw 39 protruded in a predetermined length at an inner side surface. In order to support the rotation ring 50, the guide jaw 39 may extend along an inner circumferential edge of the housing 30. Such a guide jaw 39 has a shape that supports a lower portion of the rotation ring 50 and performs a function of preventing the rotation ring 50 from moving upward or downward. The guide jaw 39 may support a protrusion portion 56 protruded at a predetermined gap along an outer circumferential edge of the rotation ring 50.

According to an embodiment of the present disclosure, the protrusion portion 56 may be integrally formed with the rotation ring 50. Further, the protrusion portion 56 is a separate member and may be fixed to an outer side surface of the rotation ring 50 with a bonding method.

According to an embodiment of the present disclosure, the protrusion portion 56 may be made of a rigid material, and the guide jaw 39 may be made of a flexible material such as rubber, urethane, silicon, or the like. In contrast, the guide jaw 39 may be made of a rigid material, and the protrusion portion 56 may be made of a flexible material such as rubber, urethane, silicon, or the like. Therefore, the rotation ring 50 receives and rotates an external force of a predetermined frictional force or more at the protrusion portion 56 contacting with the guide jaw 39.

According to an embodiment of the present disclosure, the rotation ring 50 may include a plurality of bodies 51, 52, 53, and 54 to be detected separately installed at a predetermined gap. When the rotation ring 50 rotates, such bodies 51, 52, 53, and 54 to be detected may be detected by at least one detection sensor 60 installed at a location corresponding to the rotation ring 50.

According to an embodiment of the present disclosure, when the rotation ring 50 rotates, the detection sensor 60 may detect the bodies 51, 52, 53, and 54 to be detected of the rotation ring 50 exposed through an opening formed in the ear jack housing 30. Further, the detection sensor 60 protrudes to the inside of the housing 30 to detect that the rotation ring 50 has been rotated with a method of contacting with the bodies 51, 52, 53, and 54 to be detected of the rotation ring 50.

According to an embodiment of the present disclosure, the detection sensor 60 may be a resistance sensor, and in such a case, the bodies 51, 52, 53, and 54 to be detected of the rotation ring 50 may have different resistance values. For example, when the rotation ring 50 rotates, the resistance sensor may measure a resistance value of the respective bodies 51, 52, 53, and 54 to be detected contacting with the resistance sensor. Therefore, by comparing the measured resistance values, the resistance sensor may determine a rotation distance, a rotation speed, and a rotation direction of the rotation ring 50.

According to an embodiment of the present disclosure, the detection sensor 60 may be a hall sensor, and in such a case, the bodies 51, 52, 53, and 54 to be detected of the rotation ring 50 may be a magnet having different magnetic forces. For example, when the rotation ring 50 rotates, the hall sensor may detect a magnetic force of respective magnets that close contact with the hall sensor. Therefore, the hall sensor may determine a rotation distance, a rotation speed, and a rotation direction of the rotation ring 50 through the detected magnetic force.

According to an embodiment of the present disclosure, the detection sensor 60 may be a capacitance measurement sensor including a sensor capacitance, and in such a case, the bodies 51, 52, 53, and 54 to be detected of the rotation ring 50 may have a capacitance value having different capacitances. For example, when the rotation ring 50 rotates, the capacitance measurement sensor may measure a capacitance value of the respective bodies 51, 52, 53, and 54 to be detected contacting with the capacitance measurement sensor. Therefore, the capacitance measurement sensor may compare the measured capacitance values and determine a rotation distance, a rotation speed, and a rotation direction of the rotation ring 50.

However, the detection sensor 60 is not limited thereto and may be implemented with various sensors such as a light sensor or a proximity sensor. Further, the detection sensor 60 may determine rotation information such as a rotation distance, a rotation speed, and a rotation direction of the rotation ring 50 using at least one other bodies 51, 52, 53, and 54 to be detected.

Figure 7:
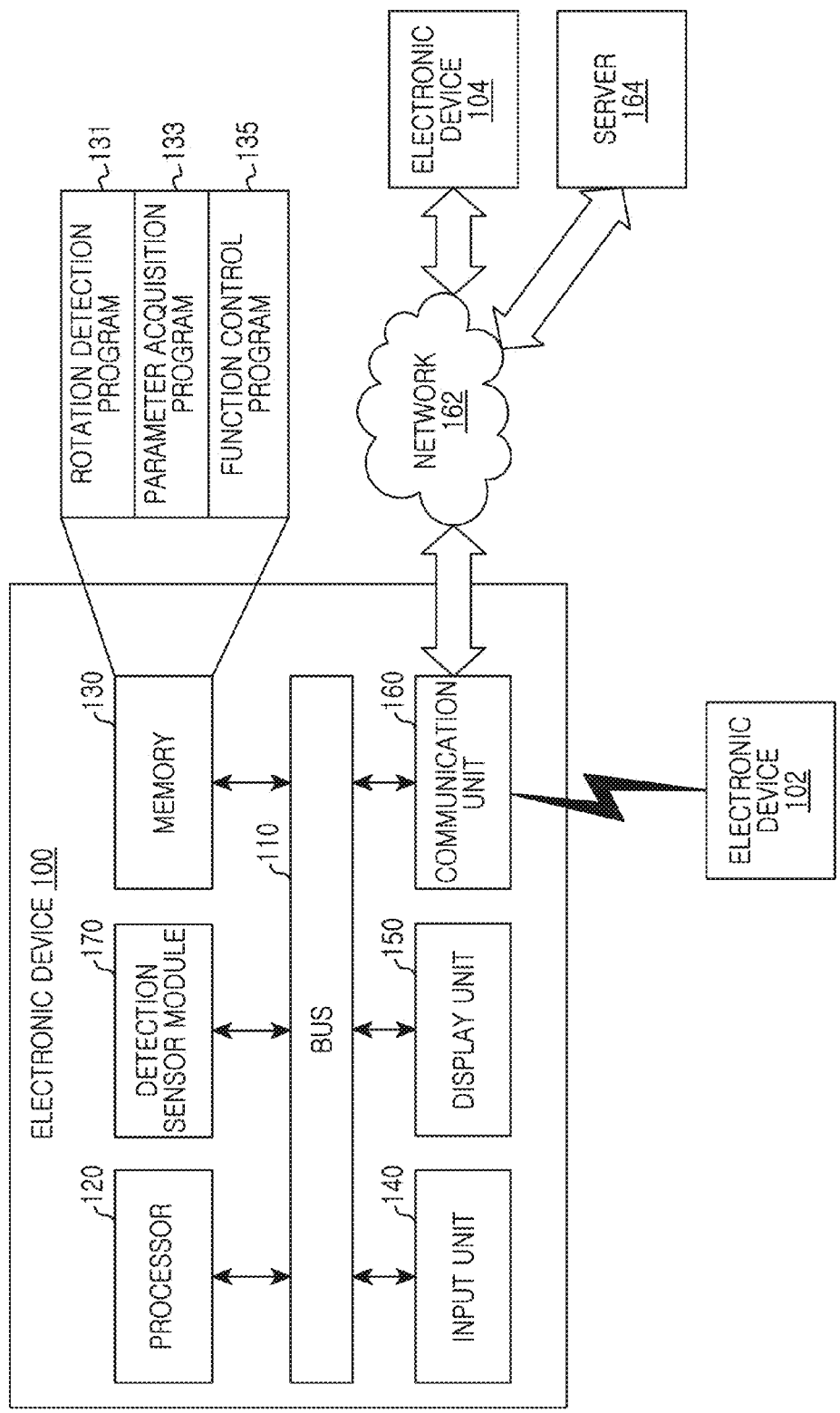
FIG. 7 is a block diagram illustrating a configuration of an electronic device according to an embodiment of the present disclosure.

FIG. 7 is a block diagram illustrating a configuration of an electronic device according to an embodiment of the present disclosure.

Referring to FIG. 7, an electronic device 100 may include a bus 110, a processor 120, a memory 130, an input unit 140, a display unit 150, a communication unit 160, and a detection sensor module 170.

The bus 110 may connect one or more of the constituent elements (e.g., the processor 120, the memory 130, the input unit 140, the display unit 150, the communication unit 160, and the detection sensor module 170) included in the electronic device 100 and control or otherwise facilitate communication between constituent elements.

The processor 120 may receive an instruction from constituent elements included in the electronic device 100 through the bus 110, decode the received instruction, and perform operation or data processing according to the decoded instruction. In this case, by executing at least one program stored at the memory 130, the processor 120 may control to provide a service corresponding to the program.

For example, by executing a rotation detection program 131, a parameter acquisition program 133, and a function control program 135, the processor 120 may control to detect a rotation of a rotation ring installed within the electronic device 100, to acquire at least one parameter according to a rotation of the detected rotation ring, and to perform a preset function based on the acquired parameter. In this case, the processor 120 may perform various functions according to a presently executing application or may perform a preset corresponding function.

Figure 9A:
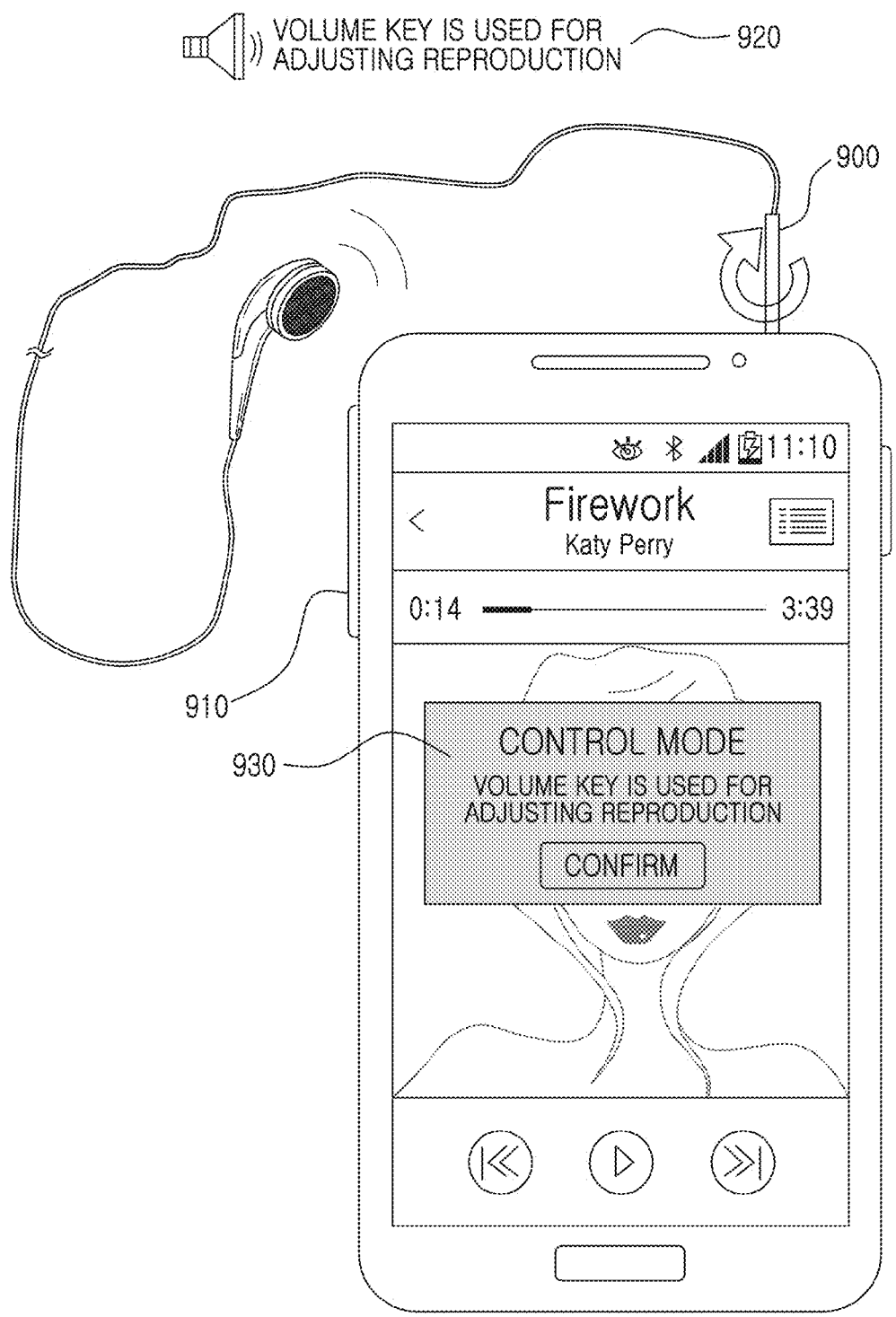
FIGS. 9A and 9B are diagrams illustrating a screen configuration for controlling a function of an electronic device using an ear jack plug according to various embodiments of the present disclosure.
Figure 9B:
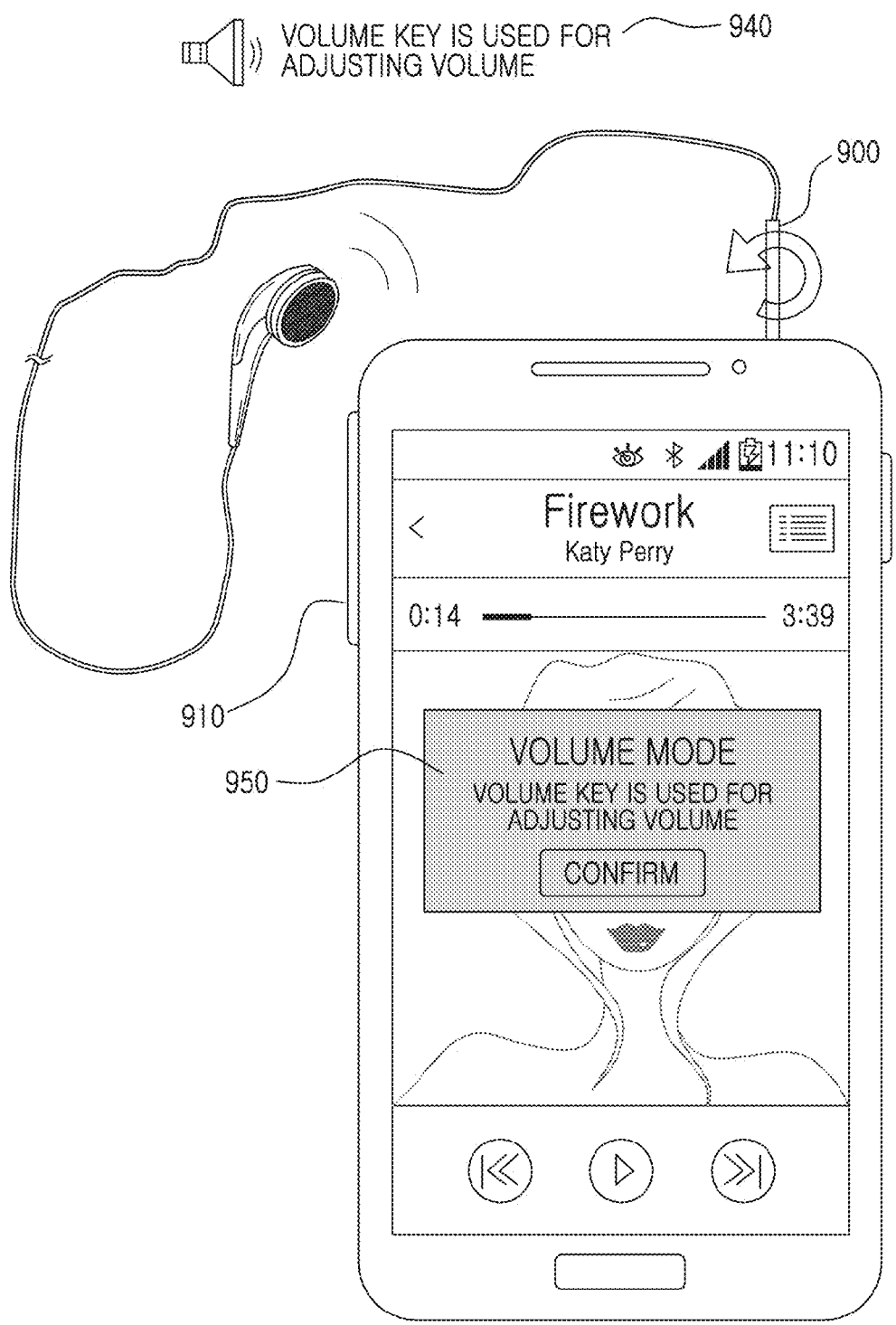

FIGS. 9A and 9B are diagrams illustrating a screen configuration for controlling a function of an electronic device using an ear jack plug according to various embodiments of the present disclosure.

Referring to FIG. 9A, in a state in which music is being reproduced, when an ear jack plug 900 rotates, the processor 120 may convert a mode of the electronic device to a control mode that can operate a volume key 910 as a reproduction related control key. In such a control mode, the processor 120 may stop reproduction of a presently reproducing song, may reproduce a song in which reproduction is stopped, or may previously reproduce a song to be reproduced in next order, or may search for an entire song to be reproduced according to a manipulation of the volume key 910. In such a case, the processor 120 may output sound data 920 and a pop-up screen 930 notifying that a mode of the electronic device is converted to a control mode. The pop-up screen 930 may query a user to confirm a setting of the control mode.

Referring to FIG. 9B, in the foregoing control mode, when the ear jack plug 900 is rotated in an opposite direction, the processor 120 may convert a mode of the electronic device to a volume mode that can operate the volume key 910 as a volume adjustment key. In such a volume mode, a volume may be raised or lowered according to a manipulation of the volume key 910. In such a case, the processor 120 may output sound data 940 and a pop-up screen 950 notifying that a mode of the electronic device is converted to a volume mode. The pop-up screen 950 may query a user to confirm a setting of the volume mode.

Figure 10:
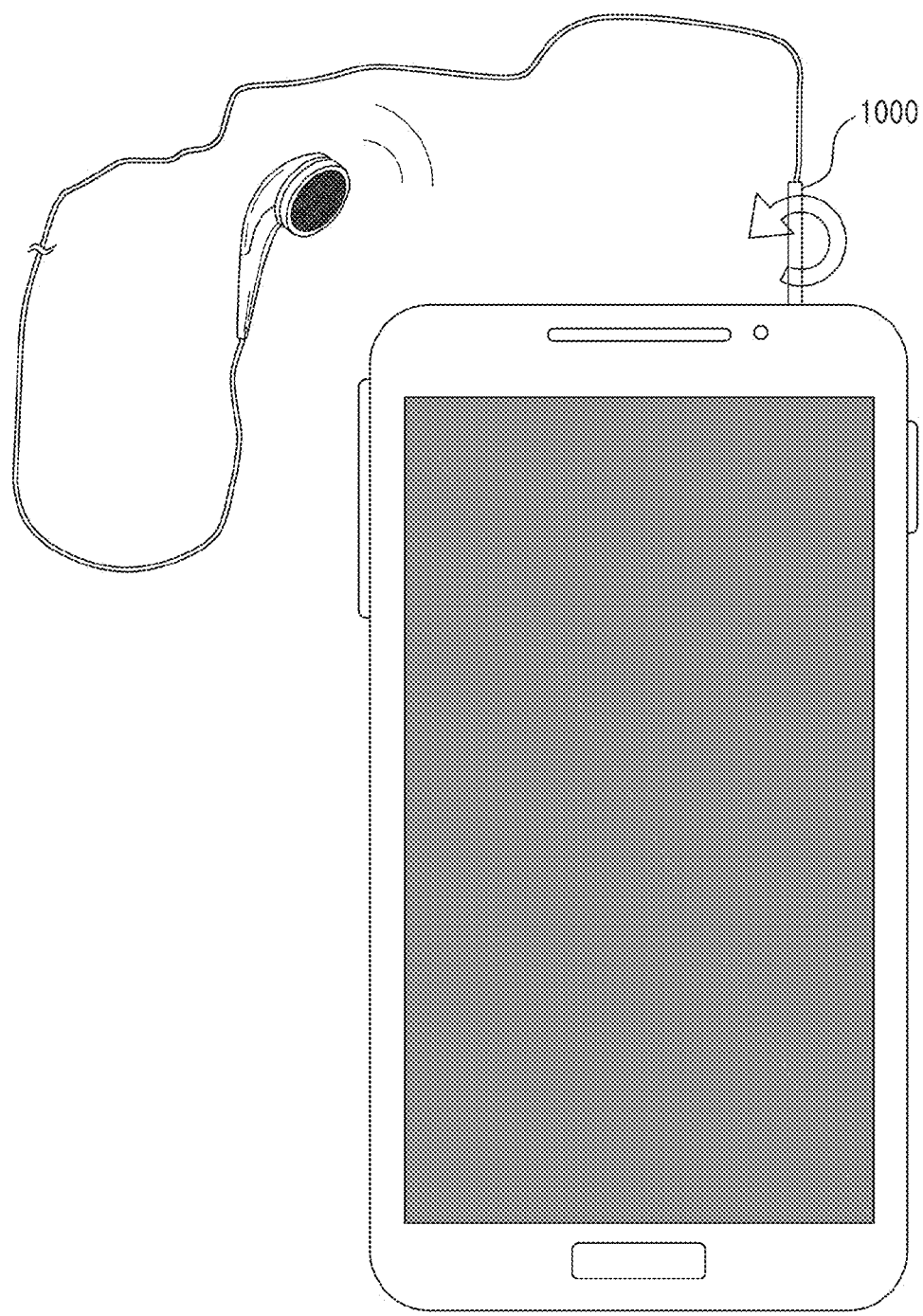
FIG. 10 is a diagram illustrating a screen configuration for controlling a function of an electronic device using an ear jack plug according to an embodiment of the present disclosure.

FIG. 10 is a diagram illustrating a screen configuration for controlling a function of an electronic device using an ear jack plug according to an embodiment of the present disclosure.

Referring to FIG. 10, in a state in which music is being reproduced, when the processor 120 detects a rotation of the ear jack plug 1000, the processor 120 may perform a reproduction related function according to a rotation of the ear jack plug. For example, in a state in which a screen is turned off, when music is reproduced, the processor 120 may stop reproduction of a presently reproducing song, may reproduce a song in which reproduction is stopped, or may previously reproduce a song to be reproduced in next order, or may search for an entire song to be reproduced according to a rotation of an ear jack plug 1000.

Figure 11A:
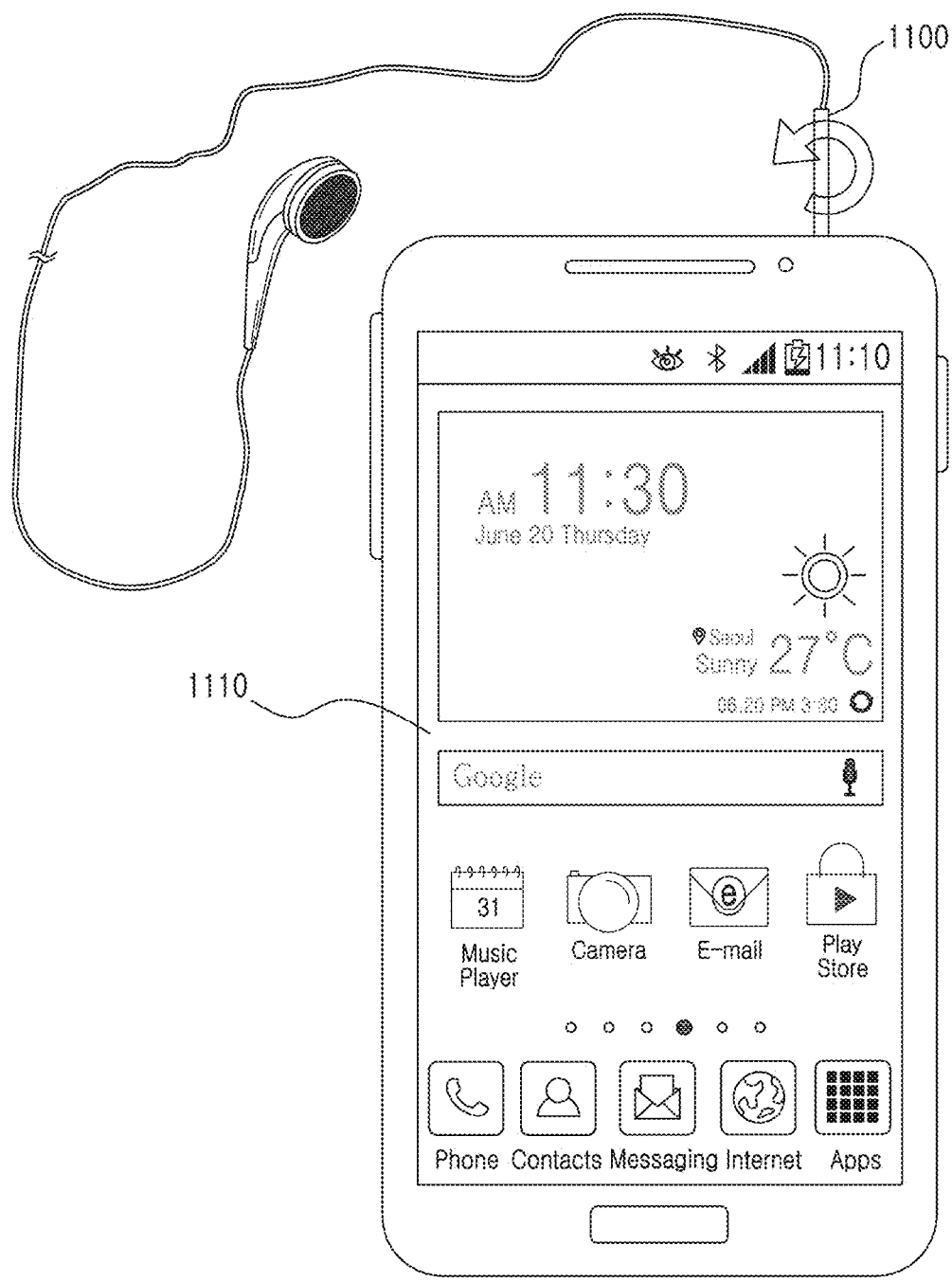
FIGS. 11A and 11B are diagrams illustrating a screen configuration for controlling a function of an electronic device using an ear jack plug according to various embodiments of the present disclosure.
Figure 11B:
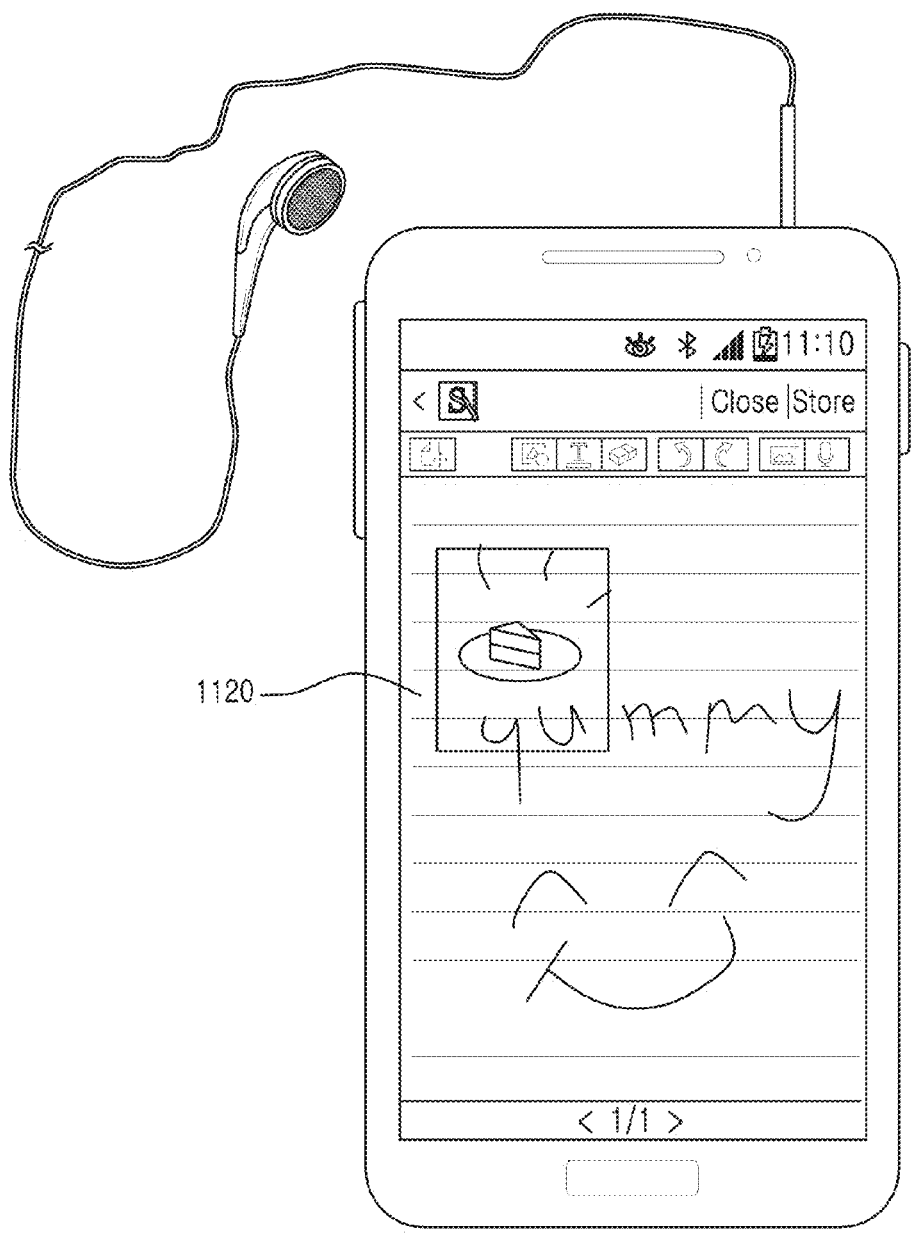

FIGS. 11A and 11B are diagrams illustrating a screen configuration for controlling a function of an electronic device using an ear jack plug according to various embodiments of the present disclosure.

Referring to FIGS. 11A and 11B, in a state in which a basic screen 1110 is displayed, when the processor 120 detects a rotation of an ear jack plug 1100, the processor 120 may execute a predetermined application 1120. An application executed with such a method is not limited to a memo application and may include an entire application in which the electronic device may execute. Further, even in a state in which other screens are displayed instead of a state in which the basic screen 1110 is displayed, the processor 120 may execute a predetermined application.

Figure 12A:
FIGS. 12A, 12B, and 12C are diagrams illustrating a screen configuration for controlling a function of an electronic device using ear jack accessory according to various embodiments of the present disclosure.
Figure 12B:
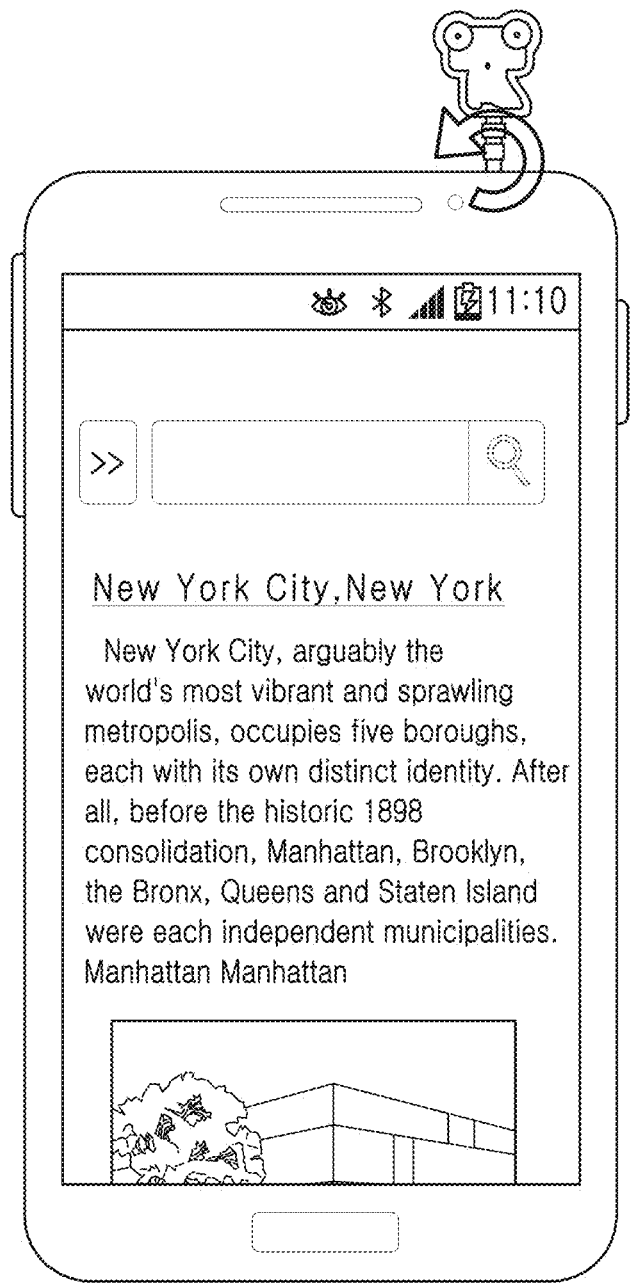
Figure 12C:

FIGS. 12A, 12B, and 12C are diagrams illustrating a screen configuration for controlling a function of an electronic device using ear jack accessory according to various embodiments of the present disclosure.

Referring to FIGS. 12A to 12C, in a state in which a web page 1210 is displayed, when the processor 120 detects a rotation of ear jack accessory 1200, the processor 120 may perform a scroll function of a corresponding webpage screen 1210. The ear jack accessory 1200 may include an ear cap inserted to protect an ear jack hole. In this case, the processor 120 may scroll the webpage screen 1210 upward or downward according to a rotation direction of the ear jack accessory 1200.

Figure 13A:
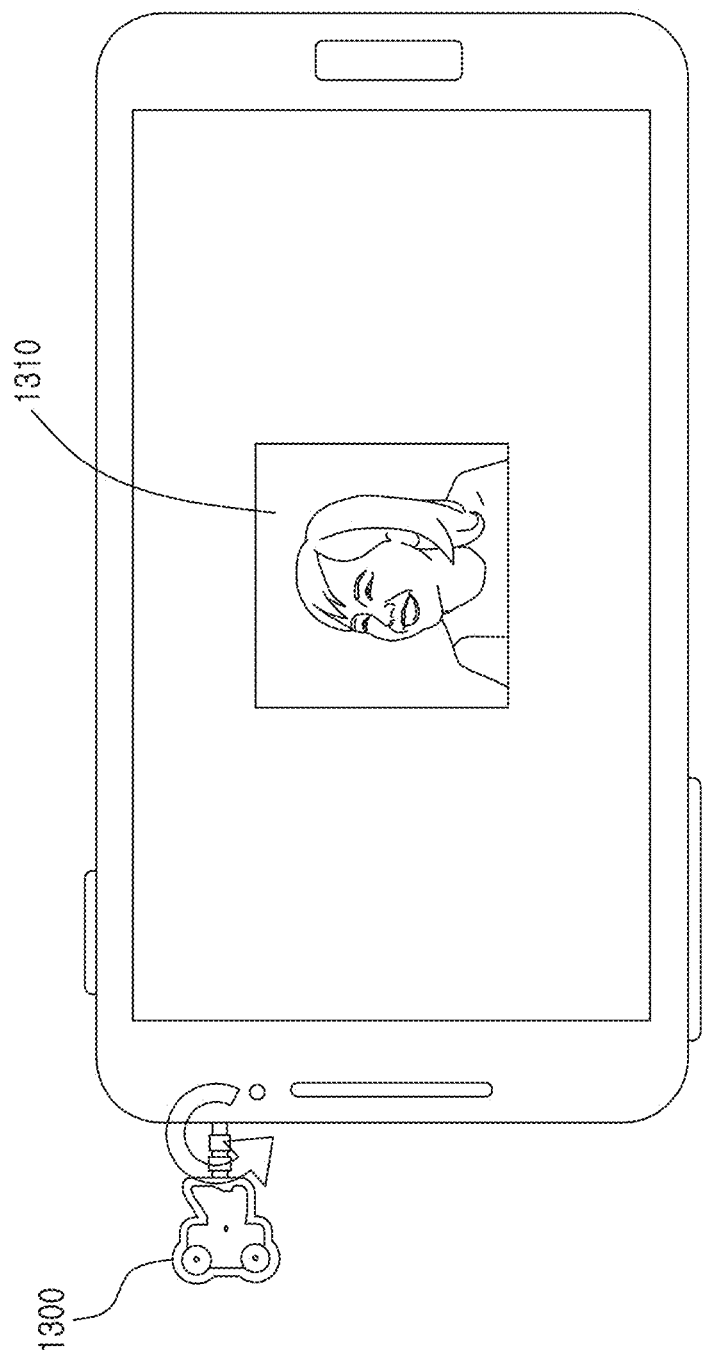
FIGS. 13A and 13B are diagrams illustrating a screen configuration for controlling a function of an electronic device using ear jack accessory according to various embodiments of the present disclosure.
Figure 13B:
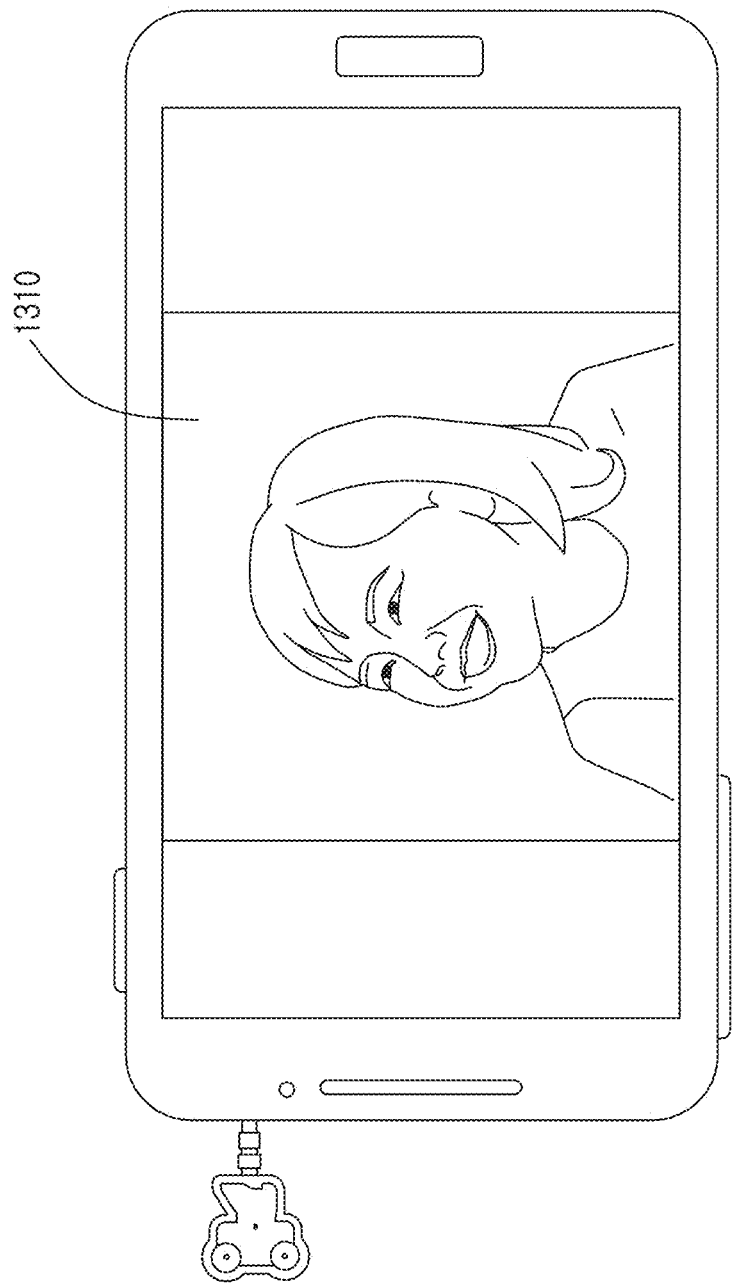

FIGS. 13A and 13B are diagrams illustrating a screen configuration for controlling a function of an electronic device using ear jack accessory according to various embodiments of the present disclosure.

Referring to FIGS. 13A and 13B, in a state in which a picture 1310 stored at a picture album is displayed, when the processor 120 detects a rotation of ear jack accessory 1300, the processor 120 may enlarge step by step the picture 1310 according to a rotation distance of the ear jack accessory 1300. Further, when the processor 120 detects a rotation of an opposite direction of the ear jack accessory 1300, the processor 120 may reduce step by step the picture 1310 according to a rotation distance of the ear jack accessory 1300.

Figure 14A:
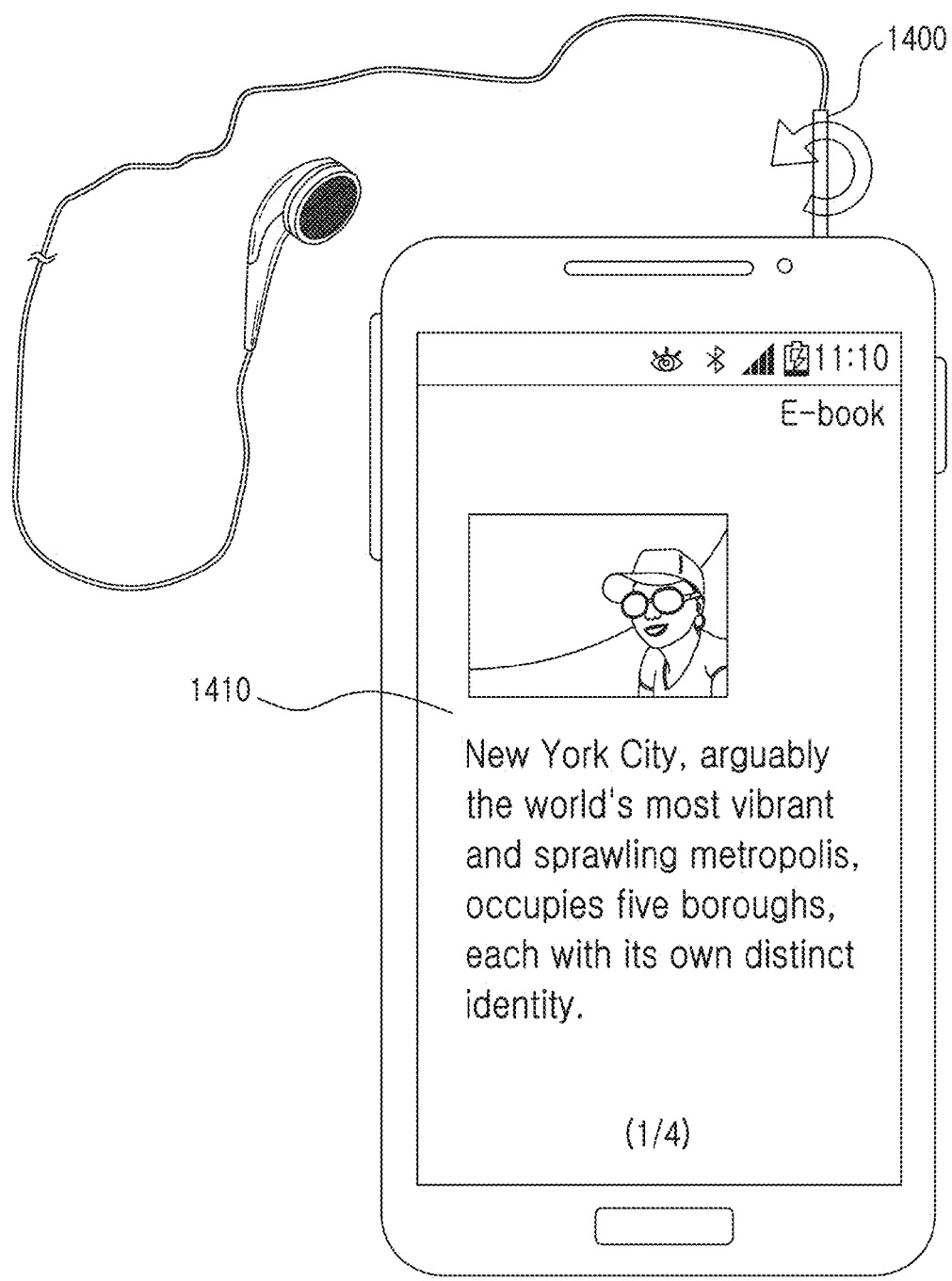
FIGS. 14A and 14B are diagrams illustrating a screen configuration for controlling a function of an electronic device using an ear jack plug according to various embodiments of the present disclosure.
Figure 14B:
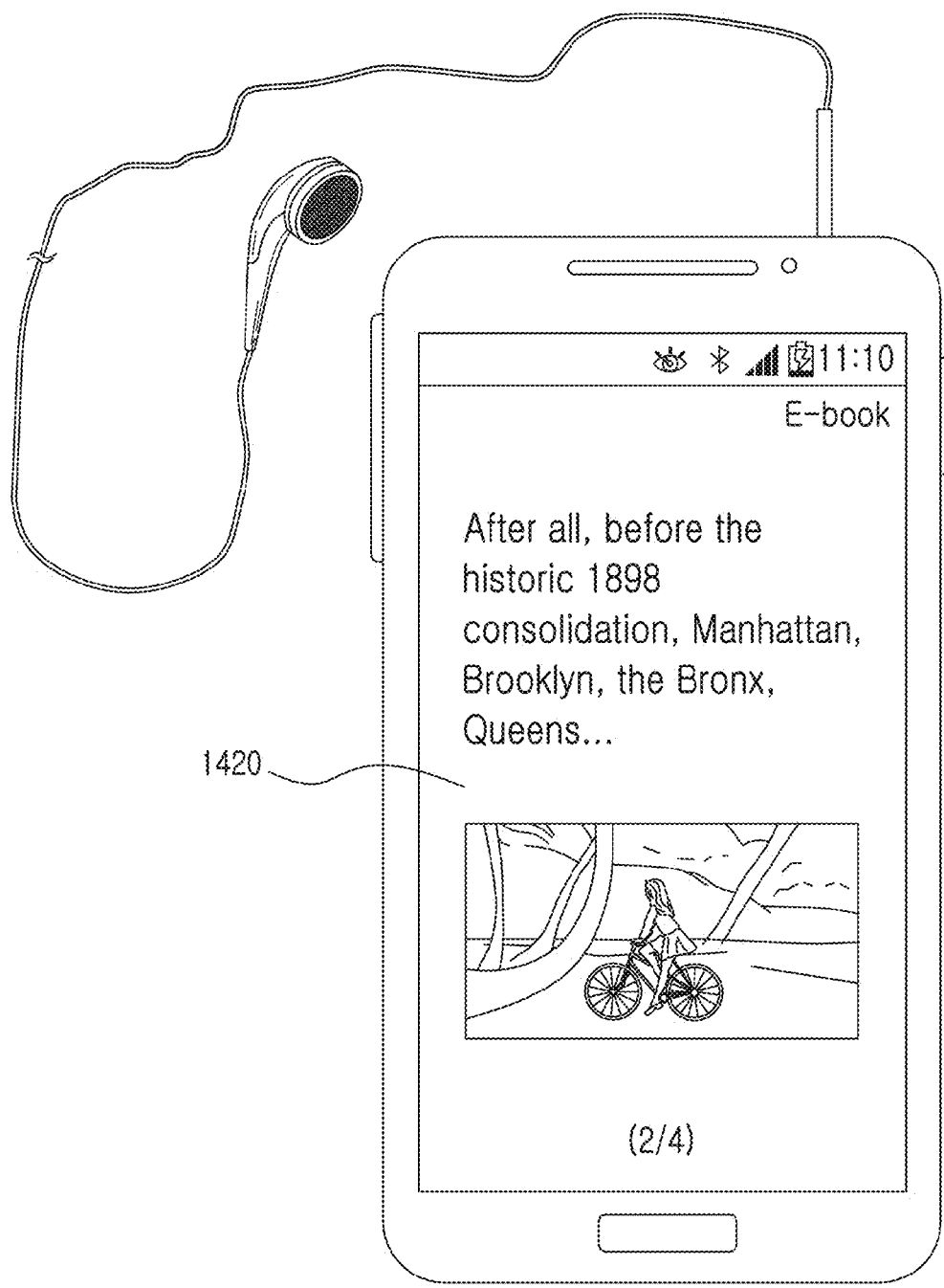

FIGS. 14A and 14B are diagrams illustrating a screen configuration for controlling a function of an electronic device using an ear jack plug according to various embodiments of the present disclosure.

Referring to FIGS. 14A and 14B, in a state in which an e-book is executed, when the processor 120 detects a rotation of an ear jack plug 1400, the processor 120 may move step by step a presently displayed web page screen 1410 according to a rotation of the ear jack plug 1400. For example, the processor 120 may display a next web page screen 1420 or an initial web page screen according to a rotation of the ear jack plug 1400. Further, the processor 120 may move a screen to a predetermined web page or may sequentially move a screen to a preset bookmark according to a rotation of the ear jack plug 1400.

Figure 15:
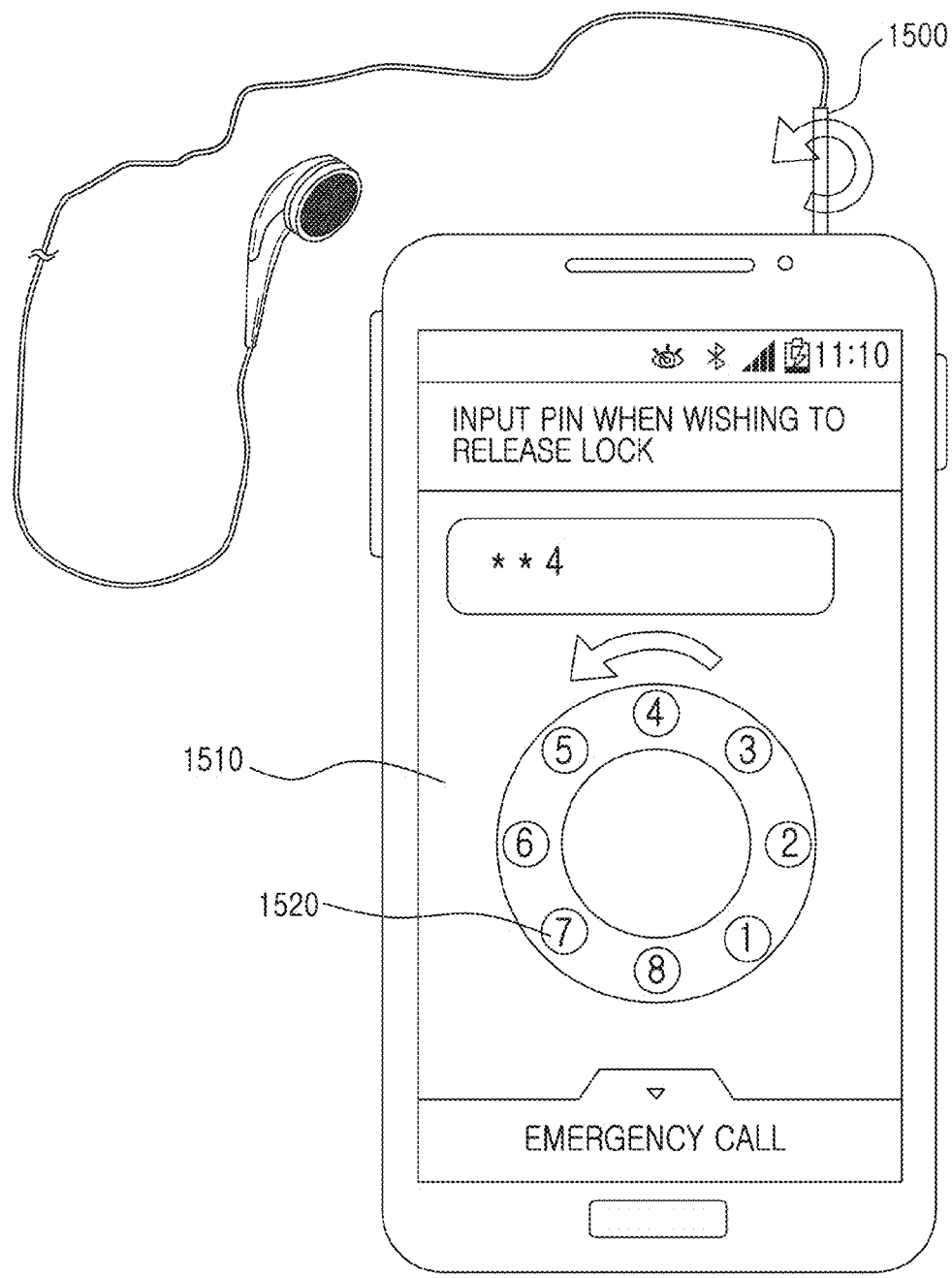
FIG. 15 is a diagram illustrating a screen configuration for controlling a function of an electronic device using an ear jack plug according to an embodiment of the present disclosure.

FIG. 15 is a diagram illustrating a screen configuration for controlling a function of an electronic device using an ear jack plug according to various embodiments of the present disclosure.

Referring to FIG. 15, in a state in which a lock screen 1510 is displayed, when the processor 120 detects a rotation of an ear jack plug 1500, the processor 120 may input a password according to a rotation of the ear jack plug 1500. For example, when the ear jack plug 1500 is rotated, the processor 120 may input a password with a method of together rotating a numeral key 1520 displayed on the lock screen 1510.

Figure 16A:
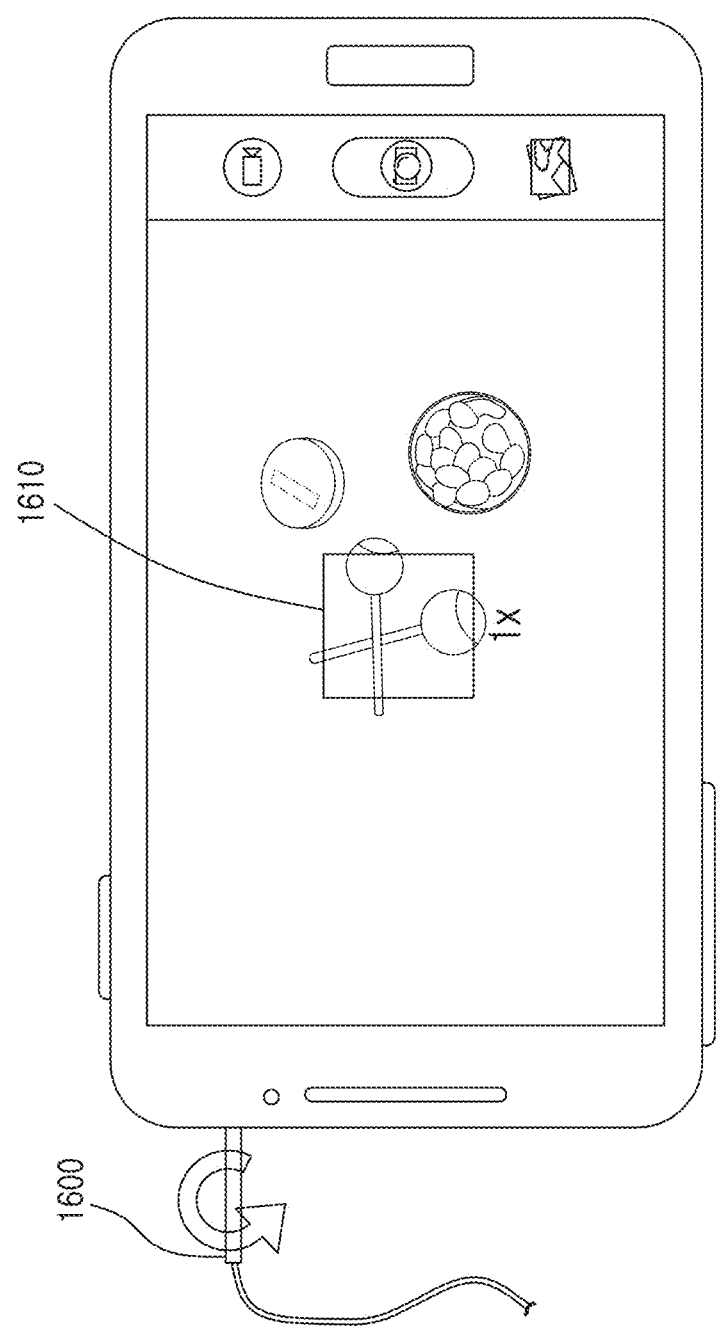
FIGS. 16A and 16B are diagrams illustrating a screen configuration for controlling a function of an electronic device using an ear jack plug according to various embodiments of the present disclosure.
Figure 16B:
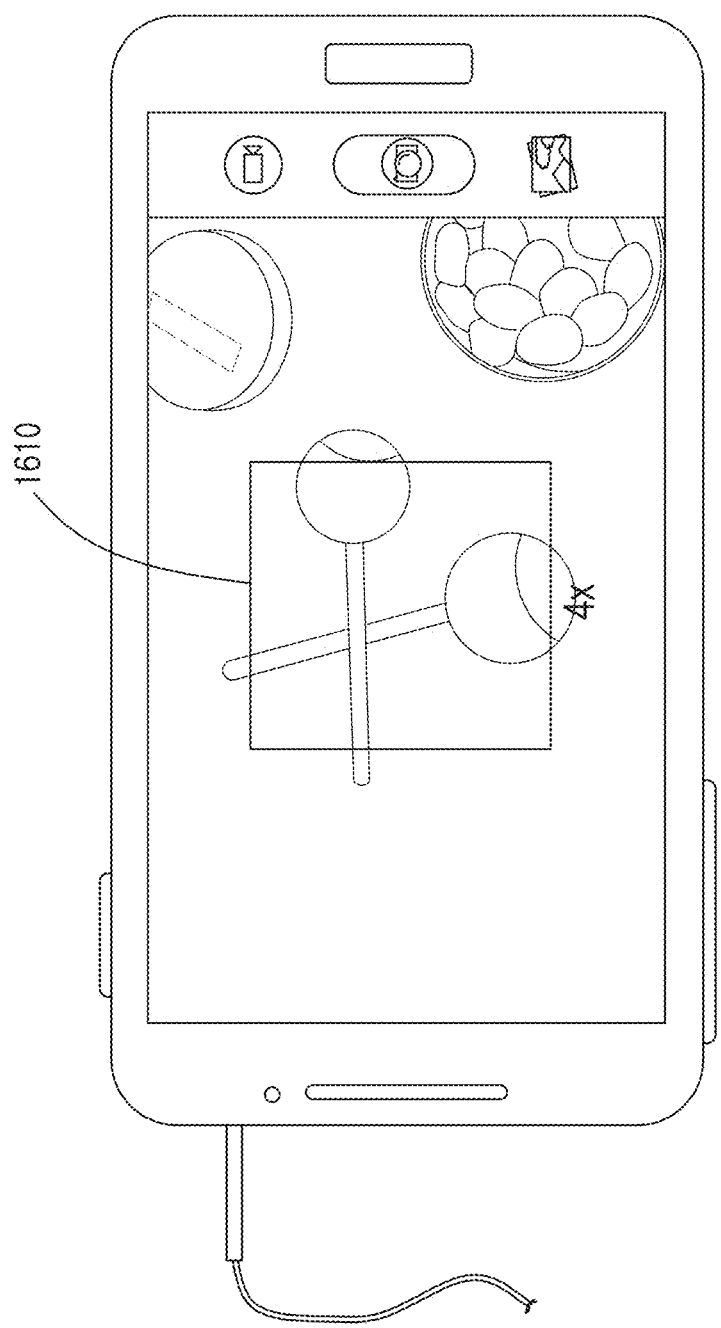

FIGS. 16A and 16B are diagrams illustrating a screen configuration for controlling a function of an electronic device using an ear jack plug according to various embodiments of the present disclosure.

Referring to FIGS. 16A and 16B, in a state in which a camera application is executed, when the processor 120 detects a rotation of an ear jack plug 1600, the processor 120 may perform a zoom-in or zoom-out function of a specific area 1610 according to a rotation of the ear jack plug 1600.

For example, the processor 120 may enlarge step by step the specific area 1610 according to a rotation of the ear jack plug 1600 or may reduce step by step the specific area 1610 according to a rotation of an opposite direction of the ear jack plug 1600.

Figure 17A:
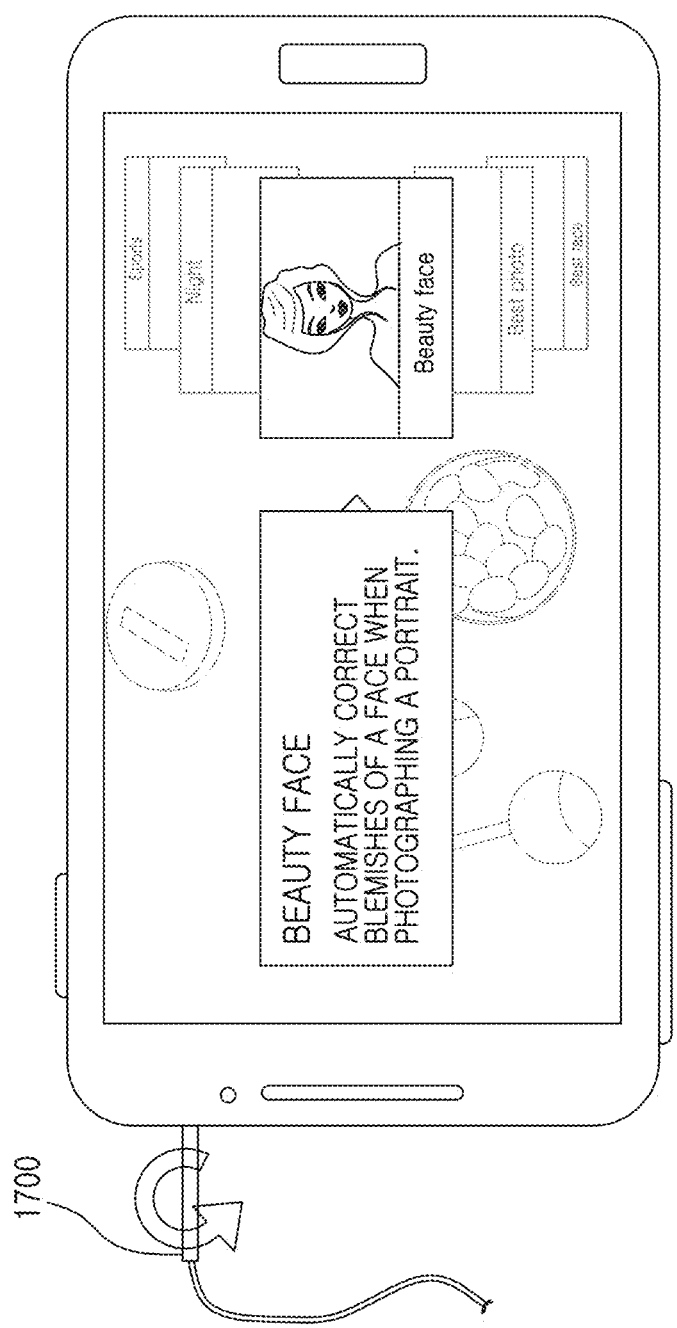
FIGS. 17A and 17B are diagrams illustrating a screen configuration for controlling a function of an electronic device using an ear jack plug according to various embodiments of the present disclosure.
Figure 17B:
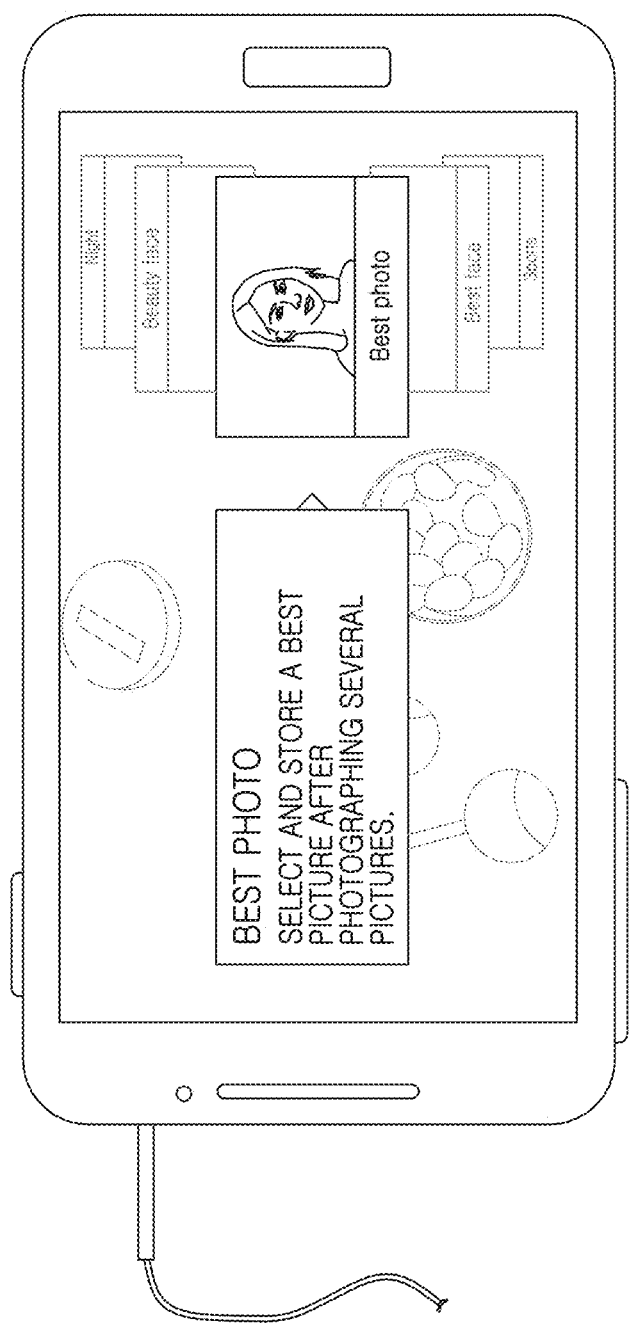

FIGS. 17A and 17B are diagrams illustrating a screen configuration for controlling a function of an electronic device using an ear jack plug according to various embodiments of the present disclosure.

Referring to FIGS. 17A and 17B, in a state in which a camera application is executed, when the processor 120 detects a rotation of the ear jack plug 1700, the processor 120 may convert a photographing mode according to a rotation of the ear jack plug 1700. For example, the processor 120 may select various photographing modes in which a camera application supports through a rotation of the ear jack plug 1700.

Figure 18B:
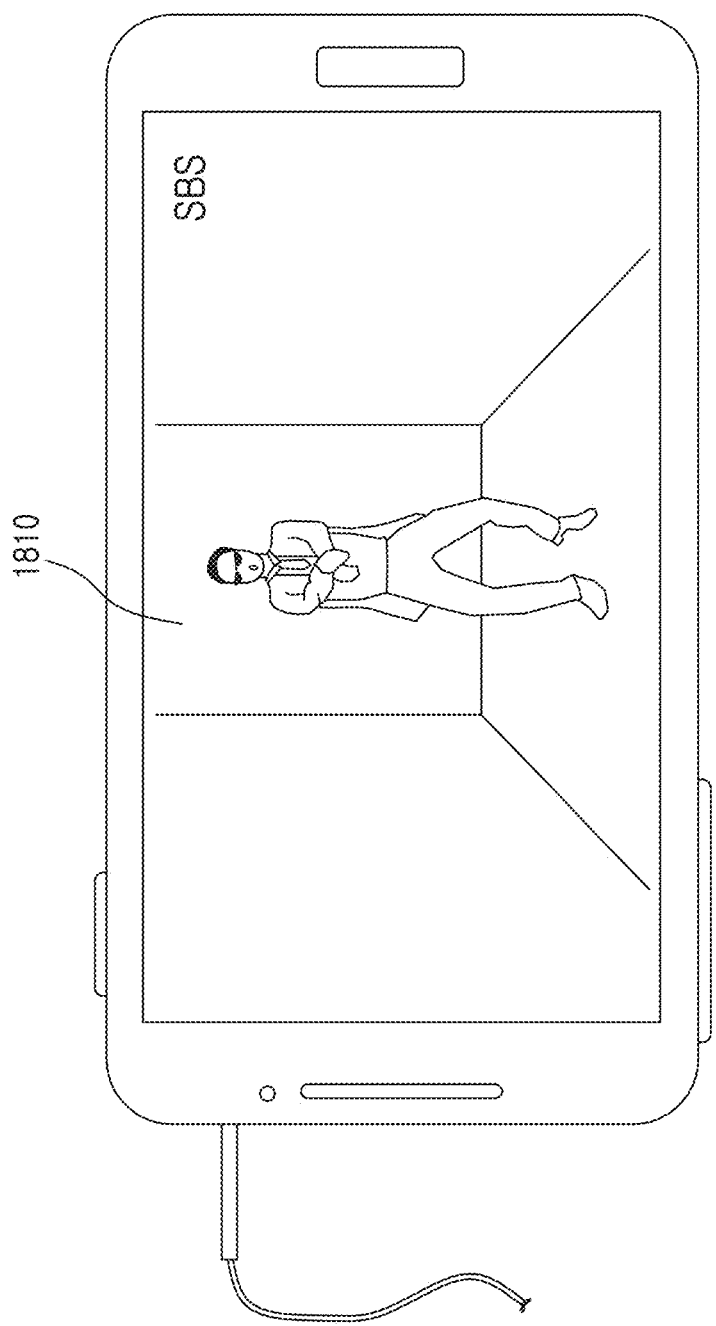

FIGS. 18A and 18B are diagrams illustrating a screen configuration for controlling a function of an electronic device using an ear jack plug according to various embodiments of the present disclosure.

Referring to FIGS. 18A and 18B, in a state in which an electronic device user views Digital Multimedia Broadcasting (DMB) 1810, when the user rotates an ear jack plug 1800, a reproducing broadcasting channel may be changed according to a rotation of the ear jack plug 1800. However, the present disclosure is not limited thereto, and when the processor 120 detects a rotation of the ear jack plug 1800, the processor 120 may adjust a volume and screen brightness of the electronic device as well as a broadcasting channel.

According to various embodiments of the present disclosure, the processor 120 may perform a function for short range communication through a rotation of the ear jack plug. For example, when pairing for Bluetooth (BT) communication is performed, the processor 120 may perform an ON/OFF function of pairing through a rotation of the ear jack plug.

According to various embodiments of the present disclosure, the processor 120 may allocate a specific function according to a rotation of the ear jack plug using a user mapping function. For example, in a state in which an application for recording is executed, when the processor 120 detects a rotation of the ear jack plug, the processor 120 may start recording or may temporarily stop recording according to a rotation of the ear jack plug.

The processor 120 may include at least one Application Processor (AP) or at least one Communication Processor (CP). The AP and the CP may be included within the processor 120 or may be included within different Integrated Circuit (IC) packages, respectively. Further, the AP and the CP may be included within one IC package.

The AP may drive an operation system or an application program to control a plurality of hardware or software components connected to the AP and perform various data processing and operations including multimedia data. The AP may be implemented with a System On Chip (SoC).

The CP may perform at least a portion of a multimedia control function. Further, the CP may perform identification and authentication of a terminal within a communication network using a Subscriber Identity Module (SIM) (e.g., a SIM card). Further, the CP may provide a service including audio dedicated communication, audiovisual communication, a text message, or packet data to the user. Further, the CP may control data transmission and reception of the communication unit 160.

The AP and/or the CP may load and process an instruction or data received from at least one of other elements or a non-volatile memory connected to each of the AP and the CP at a volatile memory. Further, the AP or the CP may store data received from at least one of other elements or generated by at least one of other elements at a non-volatile memory. The CP may perform a function of managing a data link and converting a communication protocol in communication between other electronic devices connected by a network and an electronic device including hardware. The CP may be implemented with an SoC.

Additionally, the processor 120 may further include a Graphics Processing Unit (GPU).

The memory 130 may store an instruction or data received from at least one constituent element (e.g., the processor 120, the input unit 140, the display unit 150, the communication unit 160, and the detection sensor module 170) included in the electronic device 100 or generated by at least one constituent element.

The memory 130 stores at least one program for a service of the electronic device 100. For example, the memory 130 may include a rotation detection program 131, a parameter acquisition program 133, and a function control program 135. In this case, each program may be formed with a programming module, and each programming module may be formed with software, firmware, hardware, or a combination of at least two thereof.

The rotation detection program 131 may include at least one software component for determining whether a rotation ring installed within the electronic device 100 has been rotated. In this case, the rotation detection program 131 may enable to detect a rotation of a rotation ring through at least one detection sensor. For example, the detection sensor may sequentially detect at least one body to be detected disposed at a specific gap in the rotation ring and determine that the rotation ring has been rotated.

The parameter acquisition program 133 may include at least one software component for acquiring at least one parameter according to a rotation of the detected rotation ring. In this case, the parameter acquisition program 133 may enable to acquire at least one parameter corresponding to a body to be detected through a detection sensor. For example, the parameter acquisition program 133 may enable to determine a resistance value, a magnetic force, and a capacitance of each body to be detected and a rotation speed, a rotation direction, and a rotation distance of the rotation ring using the detection sensor.

The function control program 135 may include at least one software component for performing a preset function based on the acquired parameter. In this case, the function control program 135 may enable to perform various functions according to a presently executing application or to perform a preset corresponding function.

For example, as shown in FIG. 9A, in a state in which music is being reproduced, when the ear jack plug 900 is rotated, the function control program 135 may enable to convert a mode of the electronic device to a control mode that can operate the volume key 910 as a reproduction related control key. In such a control mode, the processor 120 may stop reproduction of a presently reproducing song, may reproduce a song in which reproduction is stopped, or may previously reproduce a song to be reproduced in next order, or may search for an entire song to be reproduced according to a manipulation of the volume key 910. In such a case, the function control program 135 may enable to output the sound data 920 and the pop-up screen 930 notifying that a mode of the electronic device is converted to a control mode.

Referring to FIG. 9B, in the foregoing control mode, when the ear jack plug 10 is rotated in an opposite direction, the function control program 135 may enable to convert a mode of the electronic device to a volume mode that can operate the volume key 910 as a volume adjustment key. In such a volume mode, a volume may be raised or lowered according to a manipulation of the volume key 910. In such a case, the function control program 135 may enable to output the sound data 940 and the pop-up screen 950 notifying that a mode of the electronic device is converted to a volume mode.

According to various embodiments of the present disclosure, in a state in which music is being reproduced, when a rotation of the ear jack plug is detected, the function control program 135 may enable to perform a reproduction related function according to a rotation of the ear jack plug. Referring to FIG. 10, in a state in which a screen is turned off, when music is reproduced, the function control program 135 may enable to perform a control instruction of a music player according to a rotation distance, a rotation direction, and a rotation speed of the ear jack plug 1000. For example, when the ear jack plug 1000 is rotated to a right direction or a left direction using a rotation distance of 1 step, the function control program 135 may enable to perform a pause or play instruction of a presently reproducing song, and when the ear jack plug 1000 is rotated to a right direction or a left direction using a rotation distance of 2 steps, the function control program 135 may enable to search for a next song or a previous song. Further, when a rotation speed of the ear jack plug 1000 is quickly changed, the function control program 135 may enable to perform a fast forward or rewind function or to search for songs in a unit of two songs or three songs.

Referring to FIGS. 11A and 11B, in a state in which the basic screen 1110 is displayed, when a rotation of the ear jack plug 1100 is detected, the function control program 135 may enable to execute a predetermined application 1120. An application executed with such a method is not limited to a memo application and may include an entire application in which the electronic device may execute. Further, even in a state in which other screens are displayed instead of a state in which the basic screen 1110 is displayed, the function control program 135 may enable to execute a predetermined application.

Referring to FIGS. 12A to 12C, in a state in which the web page 1210 is displayed, when a rotation of the ear jack accessory 1200 is detected, the function control program 135 may enable to perform a scroll function of the corresponding webpage screen 1210. The ear jack accessory 1200 may include an ear cap inserted to protect an ear jack hole. In this case, the function control program 135 may enable to scroll the webpage screen 1210 upward or downward according to a rotation direction of the ear jack accessory 1200.

Referring to FIGS. 13A and 13B, in a state in which the picture 1310 stored at a picture album is displayed, when a rotation of the ear jack accessory 1300 is detected, the function control program 135 may enable to enlarge step by step the picture 1310 according to a rotation of the ear jack accessory 1300. Further, when a rotation of an opposite direction of the ear jack accessory 1300 is detected, the function control program 135 may enable to reduce step by step the picture 1310 according to a rotation of the ear jack accessory 1300.

Referring to FIGS. 14A and 14B, in a state in which an e-book is executed, when a rotation of the ear jack plug 1400 is detected, the function control program 135 may enable to move step by step a presently displayed web page screen 1410 according to a rotation of the ear jack plug 1400. For example, the function control program 135 may enable to display a next web page screen 1420 or an initial web page screen according to a rotation of the ear jack plug 1400. Further, the function control program 135 may enable to move a screen to a predetermined web page or may sequentially move a screen to a preset bookmark according to a rotation of the ear jack plug 1400.

Referring to FIG. 15, in a state in which the lock screen 1510 is displayed, when a rotation of the ear jack plug 1500 is detected, the function control program 135 may enable to input a password according to a rotation of the ear jack plug 1500. For example, when the ear jack plug 1500 is rotated, the function control program 135 may enable to input a password with a method of together rotating a numeral key 1520 displayed on the lock screen 1510.

Referring to FIGS. 16A and 16B, in a state in which a camera application is executed, when a rotation of the ear jack plug 1600 is detected, the function control program 135 may enable to perform a zoom-in or zoom-out function of the specific area 1610 according to a rotation of the ear jack plug 1600. For example, the function control program 135 may enable to enlarge step by step the specific area 1610 according to a rotation of the ear jack plug 1600 or may reduce step by step the specific area 1610 according to a rotation of an opposite direction of the ear jack plug 1600.

Referring to FIGS. 17A and 17B, in a state in which a camera application is executed, when a rotation of the ear jack plug 1700 is detected, the function control program 135 may enable to convert a photographing mode according to a rotation of the ear jack plug 1700. For example, the function control program 135 may enable to select various photographing modes in which a camera application supports through a rotation of the ear jack plug 1700.

Referring to FIGS. 18A and 18B, in a state in which the electronic device user views DMB 1810, when the ear jack plug 1800 is rotated, a reproducing broadcasting channel may be changed according to a rotation of the ear jack plug 1800. However, the function control program 135 is not limited thereto and when a rotation of the ear jack plug 1800 is detected, the function control program 135 may enable to adjust a volume and screen brightness of the electronic device as well as a broadcasting channel.

For another example, the function control program 135 may enable to perform a function for short range communication through a rotation of an ear jack plug. For example, the function control program 135 may enable to perform an ON/OFF control function of BT pairing through a rotation of the ear jack plug.

For another example, the function control program 135 may enable to allocate a specific function according to a rotation of the ear jack plug using a user mapping function. For example, in a state in which an application for recording is executed, when a rotation of the ear jack plug is detected, the function control program 135 may enable to start recording or to temporarily stop recording according to a rotation of the ear jack plug.

Further, the memory 130 may include an internal memory or an external memory. The internal memory may include at least one of a volatile memory (e.g., a Dynamic Random Access Memory (DRAM), a Static RAM (SRAM), and a Synchronous DRAM (SDRAM)) or a non-volatile memory (e.g., a One Time Programmable Read Only Memory (OT- PROM), a Programmable ROM (PROM), an Erasable and Programmable ROM (EPROM), an Electrically Erasable and Programmable ROM (EEPROM), a mask ROM, a flash ROM, a Not And (NAND) flash memory, and a Not Or (NOR) flash memory). In this case, the internal memory may have a form of a Solid State Drive (SSD). The external memory may include at least one of a Compact Flash (CF), Secure Digital (SD), Micro-SD, Mini-SD, extreme Digital (xD), a memory stick, or the like.

Further, the memory 130 may further include a kernel, middleware, and an Application Programming Interface (API).

The kernel may control or manage system resources (e.g., the bus 110, the processor 120, or the memory 130) using for executing an operation or function implemented in the remaining other programming modules (e.g., middleware, API, or application). Further, the kernel may provide an interface that accesses to an individual element of the electronic device 100 in the middleware, API, or application and that can control or manage the individual element.

The middleware may perform an intermediary function of enabling the API or the application to communicate with the kernel to give and receive data. Further, the middleware may perform load balancing of work requests received from at least one application using a method of assigning a priority that can use a system resource (e.g., the bus 110, the processor 120, or the memory 130) of the electronic device 100.

The API is an interface that enables an application to control a function of providing in the kernel or the middleware and may include at least one interface or function for a file control, a window control, an image processing, or a text control.

The input unit 140 may transmit an instruction or data occurring by a user selection to the processor 120 or the memory 130 through the bus 110. For example, the input unit 140 may include a touch panel, a pen sensor, a key, an ultrasonic wave input device, or other pointer devices.

The touch panel may recognize a touch input with at least one method of a capacitive, resistive, infrared ray, or ultrasonic wave method. The touch panel may further include a controller. When the touch panel is a capacitive touch panel, the touch panel may recognize a proximity touch as well as a direct touch. The proximity touch may be expressed with a non-contact touch or hovering. Such a touch panel may further include a tactile layer and provide a haptic reaction to the user.

The display unit 150 may display a picture, an image, or data to the user. In order to simultaneously perform an input function and a display function, the display unit 150 may include a touch panel. The touch panel may include a Liquid Crystal Display (LCD) or an Active Matrix Organic Light Emitting Diode (AMOLED) and may be implemented with a flexible, transparent, or wearable method.

The display unit 150 may include hologram, and such hologram may show a stereoscopic image in the air using interference of light. Additionally, the display unit 150 may further include a control circuit for controlling a touch panel or hologram.

The communication unit 160 may connect communication between the electronic device 100 and at least one other electronic device 102 or 104 or server 164. The communication unit 160 may support a short range communication protocol (e.g., Wi-Fi, BT, Near Field Communication (NFC) or communication of a network (e.g., Internet, Local Area Network (LAN), Wide Area Network (WAN), telecommunication network, cellular network, satellite network, or Plain Old Telephone Service (POTS)) 162.

The detection sensor module 170 may include at least one of a resistance sensor, a hall sensor, a capacitance detection sensor, a light sensor, and a rotation sensor for detecting a rotation of a rotation ring installed within the electronic device 100. Such a detection sensor module 170 may detect at least one body to be detected installed in the rotation ring and acquire at least one parameter according to the detected at least one detection body. The detection sensor module 170 may provide the acquired at least one parameter to the processor 120.

Names of the constituent elements of the electronic device 100 according to the embodiment of the present disclosure may be changed according to a kind of the electronic device 100. Further, the electronic device 100 may include at least one of the constituent elements, may omit some elements, or may further include additional other constituent elements according to a kind of the electronic device 100.

Figure 8:
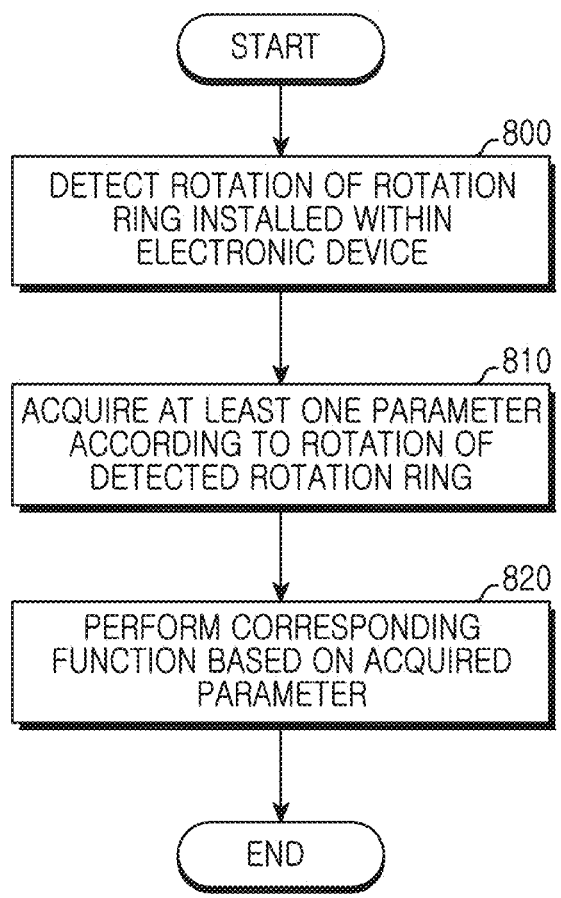
FIG. 8 is a flowchart illustrating a procedure for controlling a function of an electronic device using a rotation ring installed within the electronic device according to an embodiment of the present disclosure.

FIG. 8 is a flowchart illustrating a procedure for controlling a function of an electronic device using a rotation ring installed within the electronic device according to an embodiment of the present disclosure.

Referring to FIG. 8, the electronic device detects a rotation of a rotation ring installed therein in operation 800. For example, the rotation ring may be installed in an ear jack housing for housing an ear jack plug and may be installed in an electronic pen mounting device for housing an electronic pen. The ear jack plug and the electronic pen are mounted in the electronic device with a method of penetrating the foregoing rotation ring, and the rotation ring may together rotate by a rotation of the ear jack plug and the electronic pen. In this case, the electronic device may detect a rotation of the rotation ring through at least one detection sensor. For example, the detection sensor may sequentially detect at least one body to be detected disposed at a specific gap in the rotation ring and determine that the rotation ring has been rotated.

The electronic device acquires at least one parameter according to a rotation of the detected rotation ring in operation 810. In this case, the electronic device may acquire at least one parameter corresponding to a body to be detected through the detection sensor. For example, the electronic device may determine a resistance value and a magnetic force of each body to be detected and a rotation distance, a rotation speed, and a rotation direction of the rotation ring using the detection sensor.

The electronic device performs a preset function based on the acquired parameter in operation 820. In this case, the electronic device may perform various functions according to a presently executing application or may perform a preset corresponding function.

Referring to FIG. 9A, in a state in which music is being reproduced, when the ear jack plug 900 is rotated, the electronic device may convert a mode thereof to a control mode that can operate the volume key 910 as a reproduction related control key. In such a control mode, the electronic device may stop reproduction of a presently reproducing song, may reproduce a song in which reproduction is stopped, or may previously reproduce a song to be reproduced in next order, or may search for an entire song to be reproduced according to a manipulation of the volume key 910. In such a case, the electronic device may output the sound data 920 and the pop-up screen 930 notifying that a mode of the electronic device is converted to a control mode.

Referring to FIG. 9B, in the foregoing control mode, when the ear jack plug 10 is rotated in an opposite direction, the electronic device may convert a mode thereof to a volume mode that can operate the volume key 910 as a volume adjustment key. In such a volume mode, a volume may be raised or lowered according to a manipulation of the volume key 910. In such a case, the electronic device may output the sound data 940 and the pop-up screen 950 notifying that a mode of the electronic device is converted to a volume mode.

For another example, in a state in which music is being reproduced, when a rotation of the ear jack plug is detected, the electronic device may perform a reproduction related function according to a rotation of the ear jack plug. For example, as shown in FIG. 10, in a state in which a screen is turned off, when music is reproduced, the electronic device may stop reproduction of a presently reproducing song, may reproduce a song in which reproduction is stopped, or may previously reproduce a song to be reproduced in next order, or may search for an entire song to be reproduced according to a rotation of the ear jack plug 1000.

Referring to FIGS. 11A and 11B, in a state in which the basic screen 1110 is displayed, when a rotation of an ear jack plug 1100 is detected, the electronic device may execute the predetermined application 1120. An application executed with such a method is not limited to a memo application and may include an entire application in which the electronic device may execute. Further, even in a state in which other screens are displayed instead of a state in which the basic screen 1110 is displayed, the electronic device may execute a predetermined application.

Referring to FIGS. 12A to 12C, in a state in which the web page 1210 is displayed, when the electronic device detects a rotation of the ear jack accessory 1200, the electronic device may perform a scroll function of a corresponding webpage screen 1210. The ear jack accessory 1200 may include an ear cap inserted to protect an ear jack hole. In this case, the electronic device may scroll the webpage screen 1210 upward or downward according to a rotation direction of the ear jack accessory 1200.

Referring to FIGS. 13A and 13B, in a state in which a picture 1310 stored at a picture album is displayed, when the electronic device detects a rotation of the ear jack accessory 1300, the electronic device may enlarge step by step a picture 1310 according to a rotation of the ear jack accessory 1300. Further, when the electronic device detects a rotation of an opposite direction of the ear jack accessory 1300, the electronic device may reduce step by step the picture 1310 according to a rotation of the ear jack accessory 1300.

Referring to FIGS. 14A and 14B, in a state in which an e-book is executed, when the electronic device detects a rotation of the ear jack plug 1400, the electronic device may move step by step the presently displayed web page screen 1410 according to a rotation of the ear jack plug 1400. For example, the electronic device may display a next web page screen 1420 or an initial web page screen according to a rotation of the ear jack plug 1400. Further, the electronic device may move a screen to a predetermined web page or may sequentially move a screen to a preset bookmark according to a rotation of the ear jack plug 1400.

Referring to FIG. 15, in a state in which the lock screen 1510 is displayed, when the electronic device detects a rotation of the ear jack plug 1500, the electronic device may input a password according to a rotation of the ear jack plug 1500. For example, when the ear jack plug 1500 is rotated, the electronic device may input a password with a method of together rotating the numeral key 1520 displayed on the lock screen 1510.

Referring to FIGS. 16A and 16B, in a state in which a camera application is executed, when the electronic device detects a rotation of the ear jack plug 1600, the electronic device may perform a zoom-in or zoom-out function of the specific area 1610 according to a rotation of the ear jack plug 1600. For example, the electronic device may enlarge step by step the specific area 1610 according to a rotation of the ear jack plug 1600 or may reduce step by step the specific area 1610 according to a rotation of an opposite direction of the ear jack plug 1600.

Referring to FIGS. 17A and 17B, in a state in which a camera application is executed, when the electronic device detects a rotation of the ear jack plug 1700, the electronic device may convert a photographing mode according to a rotation of the ear jack plug 1700. For example, the electronic device may select various photographing modes in which a camera application supports through a rotation of the ear jack plug 1700.

Referring to FIGS. 18A and 18B, in a state in which the electronic device user views DMB 1810, when the ear jack plug 1800 is rotated, the electronic device may change a reproducing broadcasting channel according to a rotation of the ear jack plug 1800. However, the present disclosure is not limited thereto. For example, when the electronic device detects a rotation of the ear jack plug 1800, the electronic device may adjust a volume and screen brightness of the electronic device as well as a broadcasting channel.

According to various embodiments of the present disclosure, the electronic device may perform a function for short range communication through a rotation of the ear jack plug. For example, when pairing for BT communication is performed, the electronic device may perform an ON/OFF function of pairing through a rotation of the ear jack plug.

According to various embodiments of the present disclosure, the electronic device may allocate a specific function according to a rotation of the ear jack plug using a user mapping function. For example, in a state in which an application for recording is executed, when the electronic device detects a rotation of the ear jack plug, the electronic device may start recording or may temporarily stop recording according to a rotation of the ear jack plug.

In the embodiment of the present disclosure, various functions performed according to a rotation of an ear jack plug have been described, but the present disclosure is not limited thereto. Therefore, a function control method using the ear jack plug may be variously implemented. Further, the embodiment of the present disclosure may be performed through ear jack accessory inserted to protect an ear jack hole instead of an ear jack plug inserted into an ear jack hole.

Figure 19A:
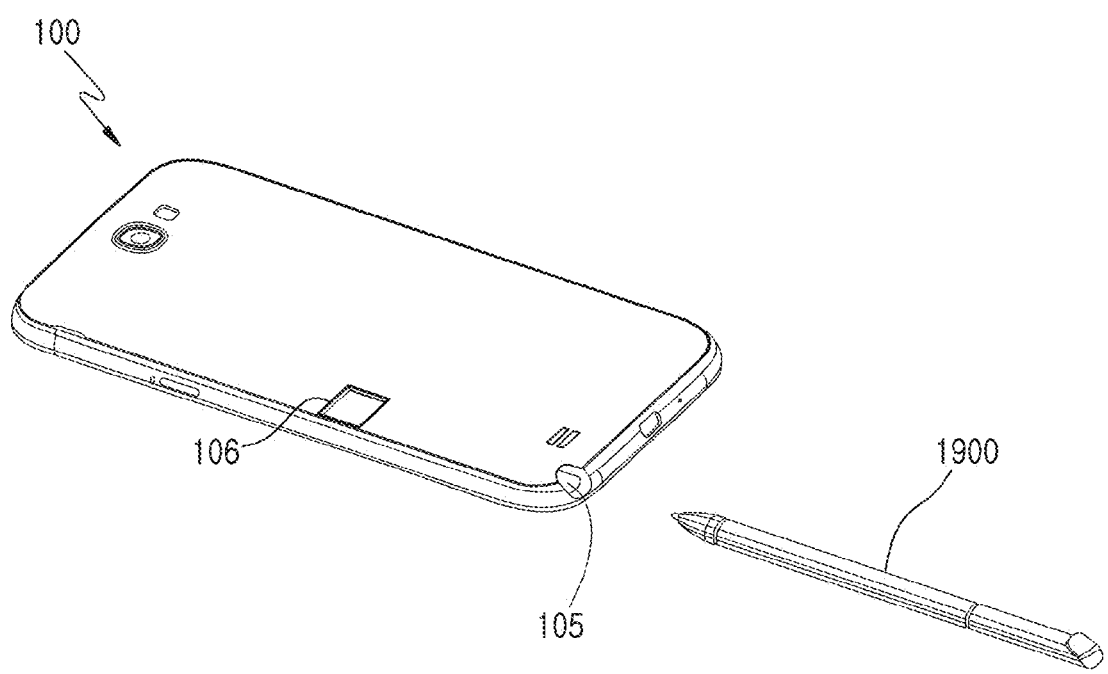
FIGS. 19A and 19B are diagrams illustrating a method of controlling a function of an electronic device using an electronic pen detachably provided in the electronic device according to various embodiments of the present disclosure.
Figure 19B:
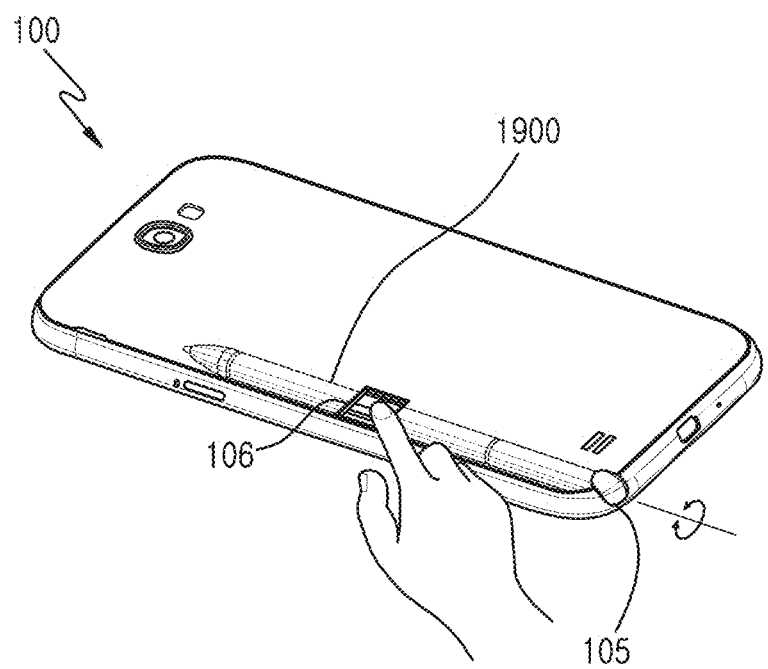

FIGS. 19A and 19B are diagrams illustrating a method of controlling a function of an electronic device using an electronic pen detachably provided in the electronic device according to various embodiments of the present disclosure.

Referring to FIGS. 19A and 19B, the electronic device 100 may have a pen mounting device 105 for housing an electronic pen 1900 at an appropriate location. In the pen mounting device 105, the foregoing rotation ring may be installed, the rotation ring may together rotate by a rotation of the electronic pen 1900.

According to an embodiment of the present disclosure, when the electronic pen 1900 is inserted into the pen mounting device 105, a portion of the electronic pen 1900 may be exposed through a pen exposure device 106 formed in the electronic device 100. In this case, the user may rotate a portion of the exposed electronic pen 1900, and a preset function of the electronic device 100 may be performed according to a rotation of such an electronic pen 1900.

According to an embodiment of the present disclosure, the electronic pen 1900 may rotate within a space of the pen mounting device 105 with a method of an earphone plug, and the electronic device 100 may perform the same function as that of the foregoing earphone plug.

As described above, in an electronic device, by securing an additional physical key using an ear jack plug, manipulation convenience of the electronic device can be enhanced.

The program (software module, software) may be stored in a random access memory, a non-volatile memory such as a flash memory, a ROM, an EEPROM, a magnetic disc storage device, a Compact Disc ROM (CD-ROM), a DVD, other types of optical storage devices, or a magnetic cassette. The program may be stored in a memory configured by some or all of the above memories. Furthermore, a plurality of configuration memories may be included.

The program may be stored in an attachable storage device approaching the electronic device through a communication network such as Internet, intranet, LAN, Wireless LAN (WLAN), or Storage Area Network (SAN) or a communication network configured by a combination thereof. The storage device may access the electronic device through an external port device.

In addition, a separate storage device on the communication network may access the electronic device.

According to various embodiments of the present disclosure, methods for capturing an image, which are intuitively operated with immediacy, and electronic devices thereof may be provided.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
    a rotation body configured to rotate with an ear jack plug and including at least one detection body disposed at a specific position in the rotation body;
    at least one detection sensor configured to detect a rotation of the at least one detection body according to a rotation of the rotation body; and
    at least one processor configured to perform a preset function based on the detection of the at least one detection sensor.

2. The electronic device of claim 1, wherein the rotation body is disposed at an ear jack housing for housing the ear jack plug.

3. The electronic device of claim 2, wherein the ear jack plug is mounted in the rotation body with a penetrating method, and the rotation body together rotates by a rotation of the ear jack plug.

4. The electronic device of claim 2, wherein the at least one detection sensor detects the at least one detection body of the rotation body which is exposed through an opening formed in the ear jack housing.

5. The electronic device of claim 2, further comprising:
    a support member for supporting the rotation body,
    wherein the support member is formed at the inside of the ear jack housing or is formed at the outside of the rotation body.

6. The electronic device of claim 5,
    wherein the support member is a support jaw formed at the inside of the ear jack housing, and
    wherein the support jaw is inserted into a guide groove of the rotation body.

7. The electronic device of claim 5,
    wherein the support member is a protrusion portion formed at the outside of the rotation body, and
    wherein the protrusion portion is supported by a guide jaw formed at the inside of the housing.

8. The electronic device of claim 5,
    wherein the rotation body is made of a rigid material, and
    wherein the support member is made of at least one material of rubber, urethane, and silicon.

9. The electronic device of claim 5,
    wherein the rotation body is made of at least one material of rubber, urethane, and silicon, and
    wherein the support member is made of a rigid material.

10. The electronic device of claim 1,
    wherein the at least one detection body has a resistance value, and
    wherein the at least one detection sensor includes a resistance sensor that detects the resistance value.

11. The electronic device of claim 1,
    wherein the at least one detection body includes a magnet, and
    wherein the at least one detection sensor is a magnetic force detection sensor that detects a magnetic force or intensity of a magnetic force of the magnet.

12. The electronic device of claim 1, wherein the rotation body is disposed in an input pen mounting device for housing an input pen.

13. The electronic device of claim 12,
    wherein the input pen is mounted in the rotation body with a penetrating method, and
    wherein the rotation body together rotates according to a rotation of the input pen.

14. The electronic device of claim 1, wherein the function includes one or more of controlling media playback, scrolling a screen operatively displayed by the electronic device, controlling a volume, controlling an application being operatively displayed by the electronic device, controlling a locking function, and controlling a camera function.

15. A method of operating an electronic device, the method comprising:
    detecting, using at least one detection sensor of the electronic device, a rotation of at least one detection body of a rotation body disposed in the electronic device, the rotation body being configured to rotate with an ear jack plug and including the at least one detection body disposed at a specific position in the rotation body; and
    performing a preset function based on the detection of the at least one detection sensor.

16. The method of claim 15, wherein the rotation body is disposed at an ear jack housing for housing the ear jack plug.

17. The method of claim 16,
    wherein the at least one detection body has a resistance value, and
    wherein the at least one detection sensor includes a resistance sensor that detects the resistance value.

18. The method of claim 16,
    wherein the at least one detection body includes a magnet, and
    wherein the at least one detection sensor includes a magnetic force detection sensor that detects a magnetic force or intensity of a magnetic force of the magnet.

19. The method of claim 16,
    wherein the at least one detection body includes a capacitor, and
    wherein the at least one detection sensor detects a capacitance of the capacitor.

20. The method of claim 15, wherein the rotation body is disposed at an ear jack housing for housing an ear jack plug, or an electronic pen mounting device for housing an electronic pen.

21. The method of claim 15, wherein the performing of the preset function comprises performing a related function according to a rotation distance, a rotation direction, or a rotation speed of the rotation body.

22. The method of claim 15, wherein the preset function includes one or more of:
- controlling media playback, scrolling a screen operatively displayed by the electronic device,
- controlling a volume,
- controlling an application being operatively displayed by the electronic device,
- controlling a locking function, and
- controlling a camera function.

23. A non-transitory computer-readable storage medium storing instructions that, when executed, cause one or more processors to perform the method of claim 1.

* * * * *